United States Patent [19]

Kiyohara

[11] Patent Number: 5,548,740

[45] Date of Patent: Aug. 20, 1996

[54] INFORMATION PROCESSOR EFFICIENTLY USING A PLURALITY OF STORAGE DEVICES HAVING DIFFERENT ACCESS SPEEDS AND A METHOD OF OPERATION THEREOF

[75] Inventor: Toshimi Kiyohara, Nara, Japan

[73] Assignee: Sharp Kabushiki Kaisha, Osaka, Japan

[21] Appl. No.: 15,866

[22] Filed: Feb. 9, 1993

[30] Foreign Application Priority Data

Feb. 10, 1992 [JP] Japan .................................... 4-023781
Feb. 17, 1992 [JP] Japan .................................... 4-29398
Feb. 24, 1992 [JP] Japan .................................... 4-036025

[51] Int. Cl.$^6$ .................................................. G06F 12/00
[52] U.S. Cl. .......................... 395/427; 395/163; 395/164; 395/497.01
[58] Field of Search .......................... 395/425, 853–855, 395/872, 873, 405, 427, 428, 431, 432, 438, 481–483, 497.01–497.04, 164–166, 101

[56] References Cited

U.S. PATENT DOCUMENTS 4,881,164  11/1989  Hailpern et al. ...................... 395/200
4,967,374  10/1990  Nomura et al. ...................... 395/150
5,182,801   1/1993  Asfour ................................. 395/425

*Primary Examiner*—Kee Mei Tung
*Attorney, Agent, or Firm*—Nixon & Vanderhye, P.C.

[57] ABSTRACT

An information processing system includes a first memory, a second memory such as a printer buffer capable of a high speed access and independent of the first memory, and an external storage device such as a fixed or hard disk. A first processor primarily uses the first memory as a storage area of information. A second processor primarily uses the second memory as a storage area of information. The second memory and the external storage are selectively used by the first processor auxiliary storage according to the usage status of the first memory and the usage status of the second memory. The second memory is used first as auxiliary storage because of its faster access speeds, and only if the second memory is currently unavailable, is the slower access speed, external storage device used.

26 Claims, 28 Drawing Sheets

| USAGE STATUS | | | STATUS TRANSITION | |
|---|---|---|---|---|
| STATUS | MAIN MEMORY | SUBPROCESSOR MEMORY | NEEDED PROGRAM | UNEEDED PROGRAM |
| 1 | VACANT | — | MAIN PROGRAM | NO ACTION |
| 2 | FULL | VACANT | MAIN PROGRAM | $LO_1$ |
| 3 | FULL | FULL | MAIN PROGRAM | $LO_3$ |
| 4 | FULL | FULL | MAIN PROGRAM | $LO_2, LO_1$ |
| 5 | FULL | FULL | SUBPROCESSOR PROGRAM | $LO_2$ |

FIG. 23(a)

MTB: MEMORY MANAGEMENT TABLE

| f | cp | hb | st |
|---|---|---|---|
| 1 | 8KB | 10KB | ALLOCATED |
| 2 | 10KB | 18KB | EMPTY |
| 3 | 12KB | 28KB | ALLOCATED |
| 4 | 3KB | 40KB | ALLOCATED |
| 5 | 10KB | 43KB | EMPTY |
| 6 | 200KB | 53KB | ALLOCATED |
| 7 | 3KB | 253KB | EMPTY |
| 8 | 100KB | 256KB | ALLOCATED |
| | | | |

FIG. 23(b)

ETB: EMPTY AREA TABLE

| F | DN | CP | HB | ST |
|---|---|---|---|---|
| 0 | 2 | 10KB | 18KB | EMPTY |
| 1 | 5 | 10KB | 43KB | EMPTY |
| 0 | 7 | 3KB | 253KB | EMPTY |
| | | | | |
| | | | | |

INFORMATION PROCESSOR EFFICIENTLY USING A PLURALITY OF STORAGE DEVICES HAVING DIFFERENT ACCESS SPEEDS AND A METHOD OF OPERATION THEREOF

BACKGROUND OF THE INVENTION

The present invention relates to an information processor efficiently using a storage device and a method of operation thereof, and more particularly, an information processor that has a plurality of high speed accessible storage devices in addition to a storage device of a large capacity that can be accessed only at low speed for providing an improved virtual storage environment utilizing these storage devices and a method of operation thereof.

Data exchange is conventionally carried out between applications that operate on equipment such as image terminals, word processors and work stations using a computer. Such data exchange is carried out as follows. Referring to FIG. 1, it is assumed that applications 1 and 2 operate on first and second windows 78 and 80, respectively, provided on an operation screen. It is assumed that document processing programs are operated as the two applications in the example shown in FIG. 1.

In the second application it is necessary to copy a partial region 82 of the text displayed in application 1 during creation of a document. In this case, the so-called "cut and paste" functionality is used. This "cut and paste" is carried out as follows.

First, a cut out region 82 is specified on the text displayed in application 1 on a window 78. Then, a storage command display key 84 displayed on window 78 is specified to operate the storage function as shown in FIG. 2. The specified character string is temporarily stored in a buffer called a cut buffer 92 in a common memory 90 prepared in a storage area of the computer used as a terminal. Next, the position to insert the stored character string is specified in application 2 operated on window 80, and a cut out key 88 is operated. The character string stored in cut buffer 92 is inserted at the specified position in the document displayed on application 2 as a cut out sentence 86.

Recent server-client models make this cut buffer in a common memory or use a cut buffer of an X server according to the regulations of ICCCM (Inter-client Communication Convention Manual: MIT X Consortium Standard) related to a certain multiwindow system.

In the data exchange carried out between these applications, the capacity of the data to be exchanged greatly depends upon the application, and there are cases where the required cut buffer capacity cannot be predicted accurately. When the size of the required cut buffer 92 greatly exceeds the standard size prepared by a main memory 94, an extended area is often provided in a secondary storage device 96 such as a hard disk similar to the virtual storage method generally used in large computers and work stations, as shown in FIG. 4. Such extension of a cut buffer using a secondary storage device 96 is also adapted in systems having a multiprocessor structure or when utilizing a cut buffer of an X server in the aforementioned server-client model.

A large computer system or a work station includes a primary storage device (main storage device) of high speed and small capacity as a storage area where a program is executed to provide a virtual storage system establishing a virtual area of large capacity, as mentioned above. The virtual storage system utilizes a secondary storage device (auxiliary storage device) of low speed and large capacity such as a magnetic disk storage device. In the virtual storage system, programs and data have their priority determined according to their access frequency. Programs and data of high priority are stored in the primary storage device, and the remaining programs and data are stored in the secondary storage device. When it becomes necessary to execute a program stored in the secondary storage device during program execution, this program is transferred to the primary storage device to be executed on the primary storage device. This operation of transferring a program from a secondary storage device to store the same into the primary storage device is called "loading". Loading of data and programs are carried out in segments or in pages.

The same area in the primary storage device is used by a plurality of programs by loading a program from a secondary storage device into the primary storage device to be executed if necessary at the time of program execution. In other words, the primary storage device functions as if it has a large storage area where a plurality of programs can be executed, resulting in increasing virtually the capacity of the primary storage device.

When a program is loaded during program execution employing the virtual storage system, the program retrieved from the secondary storage device is overwritten on a program previously stored in the primary storage device. This is called "overlay". In the case of this overlay, the former program in the primary storage device overlaid is lost unless a roll in/roll out method is employed to avoid this.

FIG. 5 is a diagram for describing a conventional roll in/roll out method. The roll in/roll out method is carried out between a primary storage device and a secondary storage device in an information processor as shown in FIG. 5. Referring to FIG. 5, the primary storage device stores first, second, and third main programs, and the secondary storage device stores a main program (not shown). In loading another main program from the secondary storage device to the primary storage device, a program in the primary storage device will be saved in the secondary storage device, and then another main program 0 is allocated in the primary storage device. Therefore, the program originally residing in the primary storage device will not be lost, and can be executed afterwards. The operation of saving a program in the primary storage device into the secondary storage device is called "roll out", and the operation of re-loading the rolled out program to the primary storage device is called "roll in".

The roll in/roll out method is used to submit temporarily a memory area in the primary storage device for an interrupting program of high processing priority during program execution. Before the program of high priority is then loaded, the program currently executed on the primary storage device is rolled out, and the program of high priority is then loaded. On completion of the execution of the program of high priority, the rolled out program that had its execution interrupted is rolled in to re-start its execution.

Thus, the roll in/roll out method in a virtual storage system is carried out between a primary storage device and a secondary storage device.

The secondary storage device shown in FIG. 5 is generally a magnetic disk storage device (referred to as HD hereinafter) or a flexible disk storage device (referred to as an FD hereinafter). The data reading speed and writing speed of a secondary storage device is very slow in comparison with a DRAM (Dynamic Random Access Memory) or an SRAM (Static Random Access Memory) forming the primary storage device.

The standard access speed of a SRAM, a DRAM, a hard disk, and a floppy disk is shown in Table 1 in an access of a unit of 4 KB.

TABLE 1

| Storage Device | Access Speed | After Normalization (SRAM = 1) |
| --- | --- | --- |
| SRAM | about 20 ns~100 ns | 1 |
| DRAM | 60 ns~110 ns | ≈1 |
| Hard Disk | about 20 ms | $10^5$~$10^6$ |
| Floppy Disk | Hundreds ms | $10^6$~$10^7$ |

It can be appreciated from Table 1 that the access speed of an HD forming a secondary storage device is slower by $10^5$–$10^6$ times in comparison with that of a SRAM or a DRAM forming a primary storage device. It can also be appreciated that the access speed of an FD forming a secondary storage device is slower by $10^6$–$10^7$ times. It is apparent that there is great difference in the access speed between a primary storage device and a second storage device.

This difference in the access speed between a primary storage device and a secondary storage device creates a problem of delaying the program exchange speed at the time of roll in/roll out of a program. This problem will in turn creates the problem of delaying the overall processing speed of an information processor including a secondary storage device in relation to a primary storage device employing the virtual storage system. Moreover a delay in the program exchange speed becomes significant as the capacity of the program to be rolled in/rolled out increases.

When a secondary storage device is used as the aforementioned extended area of a cut buffer as in a virtual storage system, the area that can be utilized can be greatly increased. Therefore, any data regardless of its size can be exchanged by using this extended area. However, hard disks and floppy disks used as secondary storage devices have inferior read/write speed in comparison with that of DRAMs and SRAMs used as primary storage devices (main memory) as described above. This low access speed is the bottleneck in improving the speed of data exchange between applications in using an extended area of a cut buffer as a secondary storage device.

A method of using a disk cache as a method of avoiding this problem common to a virtual storage and data exchange using a cut buffer is known. Disk cache is a method of increasing the access speed of a secondary storage device characterized in that data in the secondary storage device that has particularly high access frequency is stored in a semiconductor memory.

A RAM disk cache is employed in a personal computer by mounting a RAM (Random Access Memory) as an extension of the main storage device to improve the processing speed in the above-described virtual storage system. Increase in the processing speed by this RAM disk cache can be achieved in the virtual storage system even in a computer system employing a multiprocessor structure.

The above-described method of improving the access speed of a secondary storage device in the virtual storage system requires the provision of a high speed access memory in addition to the primary storage device. This results in the increase of cost and also prevents reduction in size of the device.

Furthermore, when the application program processes continuously data exceeding a predetermined cache capacity, the processing performance of the device will be degraded since the cache capacity is not adequate. The optimum capacity of the disk cache varies during execution of an application program, resulting in a problem that the optimum capacity of a disk cache could not be predicted.

In order to avoid the high cost and the problem relating to optimum capacity when such a disk cache is employed, many information processors of low cost employ, not the disk cache method, but a method of reading/writing data directly with a secondary storage device. However, as described with reference to Table 1, the secondary storage device is low in access speed in comparison with the primary storage device. Because the overhead associated with the access time period with respect to a secondary storage device prevents an increase in the program exchange speed at the time of program overlay, the actual of accessing the secondary storage device is not the basic solution to the problem.

SUMMARY OF THE INVENTION

In view of the foregoing, an object of the present invention is to provide an information processing system having a plurality of storage devices and that can use the storage devices more efficiently.

Another object of the present invention is to provide an information processing system having a plurality of storage devices for using the storage devices more efficiently without increase in cost.

A further object of the present invention is to provide an information storage system having a plurality of storage devices that (1) use the storage devices more efficiently without increasing cost and allow high speed processing.

Still another object of the present invention is to provide an information processing system having a plurality of storage devices that (1) use a larger storage space without increase cost and (2)allow high speed processing.

An information processing system according to the present invention includes a first storage device accessible at a predetermined first average access speed, a second storage device accessible at a predetermined second average access speed and independent of the first storage device, a third storage device apart from the second storage device and accessible only at a third average access speed that is lower than the first and second average access speed, a first processing device using the first storage device as a storage area of information, a second processing device apart from the first processing device and using the second storage device as a storage area of information, and a first usage device for using the second and third storage devices as an auxiliary storage of the first storage device according to the usage status of the first storage device by the first processing device and the usage status of the second storage device by the second processing device, wherein the first usage device uses the second storage device in a priority higher than the third storage device.

According to this information processing system, the second storage device of high speed is used at a priority higher than the third storage device of low speed as the auxiliary storage of the first storage device, whereby the access speed with respect to the auxiliary device becomes higher than a case using only the third storage device.

According to another preferable embodiment of the present invention, the first usage device includes a device for managing the third storage device as a virtual storage area for the first storage device, a device for determining whether the second storage device is in an unused status, a device responsive to the determination that the second storage device is in an unused status for transferring and storing into the second storage device at least a portion of the virtual storage for the first storage device of the third storage device, a device for managing predetermined information regarding the virtual storage transferred to the second storage device, a device for determining whether the access request to the first storage device from the first processing device requests an access to the virtual storage, a device responsive to the determination that an access is requested to the virtual storage to refer to the device for managing predetermined information regarding the virtual storage transferred to the second storage device for making determination which of the second and third storage device the relevant information is stored, and a device responsive to the determination result of the determination device for reading out and transferring to the first storage device information to which access is requested of the second or third storage device.

When the second storage device is in an unused status in the information processing system including the second storage device, the information stored in the third storage device can be transferred to the second storage device so that the second storage device can be used as a virtual storage. Thus, second storage device can be used efficiently. The access to the virtual storage is faster than in a conventional case.

According to a further preferable embodiment of the present invention, the first processing device includes a first adapting process using a first partial area of the first storage device, and a second adapting process using a second partial area of the first storage device, said first and second partial areas including a common area, and a device for controlling data exchange between the first and second adapting processes via the common area, wherein the control device includes a device for determining whether the storage region required by the data exchanged from the first adapting process to the second adapting process is larger than the common area, a device responsive to the determination that the storage area required by the exchange data is not larger than the common area for temporarily storing the exchange data into the common area for permitting the stored data to be read out by the second adapting process, and a device responsive to the determination that the storage area required by the exchange data is larger than the common area to request an auxiliary storage area required by the exchange data to be reserved in the first usage device for temporarily storing the exchange data into the auxiliary storage area reserved by the first usage device and the common area, and for permitting the stored data to be read out by the second adapting process.

Because the second storage device accessible at a high speed is used prior to the third storage device as an extended area of the common area, data exchange of a large amount can be executed at a speed higher than that of a conventional case.

According to a further preferable embodiment of the present invention, the first usage device includes a device for determining whether the storage capacity of the empty area of the first storage device is insufficient or not in comparison with the request of the first processing device, a device responsive to the determination of the determination device that the storage capacity of the empty area of the first storage device is insufficient for selecting information occupying an area greater than the insufficient storage area out of the information stored in the first storage device according to a predetermined standard, a device for searching first an empty area of the second storage device and then an empty area of the third storage device to find the first empty area having a capacity sufficient for storing the selected information, a device for transferring and storing into the empty area found by the searching device the selected information stored in the first storage device, a device for releasing the area of the first storage device in which the transferred information was stored for usage by the first processing device, and a device for transferring into the first storage device the information transferred and stored in the empty area found by the searching device in response to a request from the first processing device.

when the empty area in the first storage device is not sufficient and the first storage device must be rolled out to a virtual storage in the present information processing system, the roll out destination is set to the second storage device accessible at a speed higher than the third storage device, so that roll out can be carried out at a speed higher than that of a conventional case. If the information processing system includes a second storage device in addition to a first storage device and a third storage device, these storage devices can be used efficiently, whereby a high speed virtual storage can be used without adding a new hardware.

According to another aspect of the present invention, in an information processing system including a first storage device accessible at a predetermined first average access speed, a second storage device independent of the first storage device and accessible at a predetermined second average access speed, and a third storage device independent of the second storage device and accessible at a third average access speed lower than the first and second average access speed, a first processing device using the first storage device as the storage area of information, and a second storage device apart from the first processing device and using the second storage device as a storage area of information, a method of reserving an auxiliary storage area of the first storage device includes the steps of determining whether the storage capacity of an empty area of the first storage device is insufficient or not in comparison with a request of the first processing device, and reserving a storage capacity required to satisfy the request of the first processing device by using the second storage device in a priority higher than the third storage device.

According to a preferable embodiment of the present invention, the step for searching this method includes: a first calculating step to search in a predetermined sequence an empty area of the second storage device for sequentially calculating the sum thereof until all the empty areas in the second storage device have their total size calculated, or until the total empty area becomes a size sufficient for compensating for the shortage of the storage capacity of the first storage device; a second calculating step responsive to the detection that an empty area sufficient for compensating for the shortage of the storage capacity of the first storage device by the first calculating step was not found to search in a predetermined sequence an empty area of the third storage device for sequentially calculating the total thereof until all the empty area in the third storage device has its total size calculated, or until the total empty area of the calculated result of the first calculating step and the calculated result of the second calculating step has a size sufficient for compensating for shortage of the storage capacity of the first storage device, and a management step for relating to the first storage device the empty area having a total size sufficient for compensating for the shortage of the storage capacity of the first storage device and found in the second and third storage devices by the first and second calculating steps for usage as an auxiliary storage.

According to a further preferable embodiment of the present invention, the usage step includes: a step for managing the third storage device as a virtual storage area for the first storage device; a step for making determination whether the second storage device is in an unused state; a step responsive to the determination of the second storage device being in an unused status for transferring and storing into the second storage device at least a portion of the virtual storage of the first storage device of the third storage device; a step for managing predetermined information regarding the virtual storage transferred to the second storage device, a step for determining whether the access request for the first storage device from the first processing device requests an access to the virtual storage; a step responsive to the determination that an access is requested to the virtual storage to refer to the predetermined information regarding the virtual storage transferred to the second storage device for making determination which of the second storage device and the third storage device the relevant information is stored; and a step responsive to the determination result of the determination step for reading out and transferring to the first storage device the information of which access is requested from the second or third storage device, According to a further preferable embodiment, the first processing device includes a first adapting process using a first partial area of the first storage device, and a second adapting process using a second partial area of the first storage device, wherein the first and second partial areas include a common area, and a device for controlling data exchange between the first and second adapting processes via the common area, wherein the step for determining whether the storage capacity of the empty area of the first storage device is insufficient or not includes: a step for determining whether the storage area required by the data exchanged from the first adapting process to the second adapting process is greater than the common area; a step responsive to the determination that the storage area required by the exchange data is not greater than the common area to temporary store into the common area the exchange data for permitting the stored data to be read out by the second adapting process; and a step responsive to the determination that the capacity area required by the exchange data is greater than the common area to request to the usage step an auxiliary storage device required by the exchange data to be reserved for temporarily storing the exchange data into the auxiliary storage area reserved by the usage step and into the common area for permitting the stored data to be read out by the second adapting process.

According to still another preferable embodiment of the method, the usage step includes: a step for determining whether the storage capacity of the empty area of the first storage device is insufficient or not in comparison with the request of the first processing device; a step responsive to the determination that the storage capacity of the empty area of the first storage device is insufficient for selecting according to a predetermined standard the information occupying an area greater than the insufficient storage area out of the information stored in the first storage device; a step for searching first an empty area of the second storage device and then an empty area of the third storage device until the first empty area is found having a capacity sufficient for storing the selected information; a step for transferring and storing the selected information stored in the first storage device into the empty area found by the searching step; a step for releasing the area of the first storage device in which the transferred information was stored for usage by the first processing device; and a step for transferring into the first storage device the information transferred and stored into the empty area found by the searching step in response to a request from the first processing device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 23 (a) and (b) show examples of the structure of the tables referred to during execution of the process of the flow of FIG. 22.

DESCRIPTION OF THE PREFERRED EMBODIMENTS

In the following, an improved data exchange system using a cut buffer between applications, an improved virtual storage system, and an improved disk access system similar to the disk cache system are described in order as the first preferable embodiment, the second preferable embodiment, and the third preferable embodiment, respectively, of the present invention. It is to be understood that the present invention is not limited to these embodiments, and may be applied to an information processor having a plurality of storage devices of difference access speed.

First Embodiment

Figure 1:
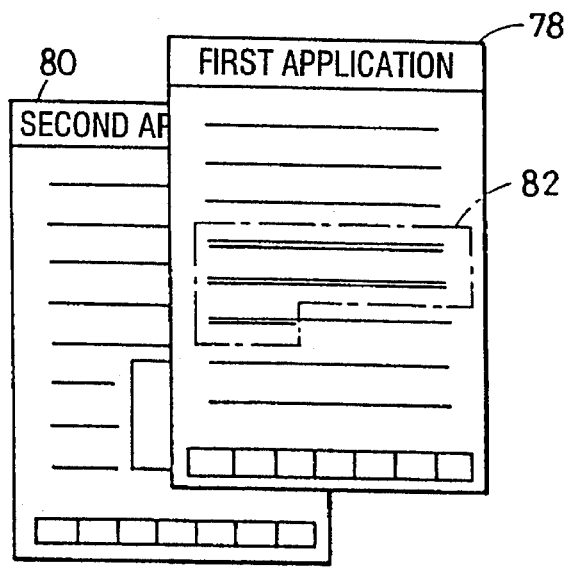
FIGS. 1–3 schematically show the status of data exchange between applications.
Figure 2:
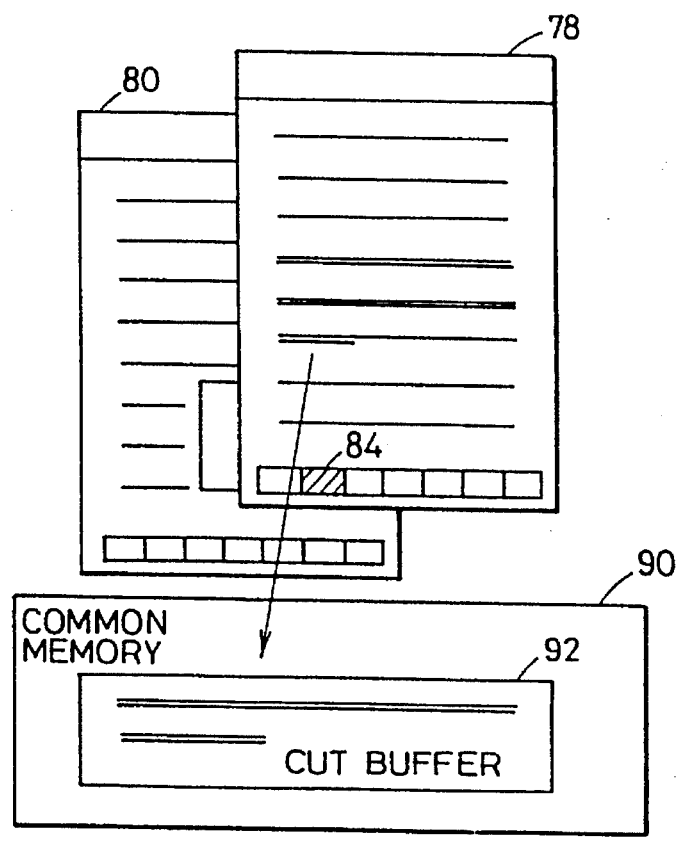
Figure 3:
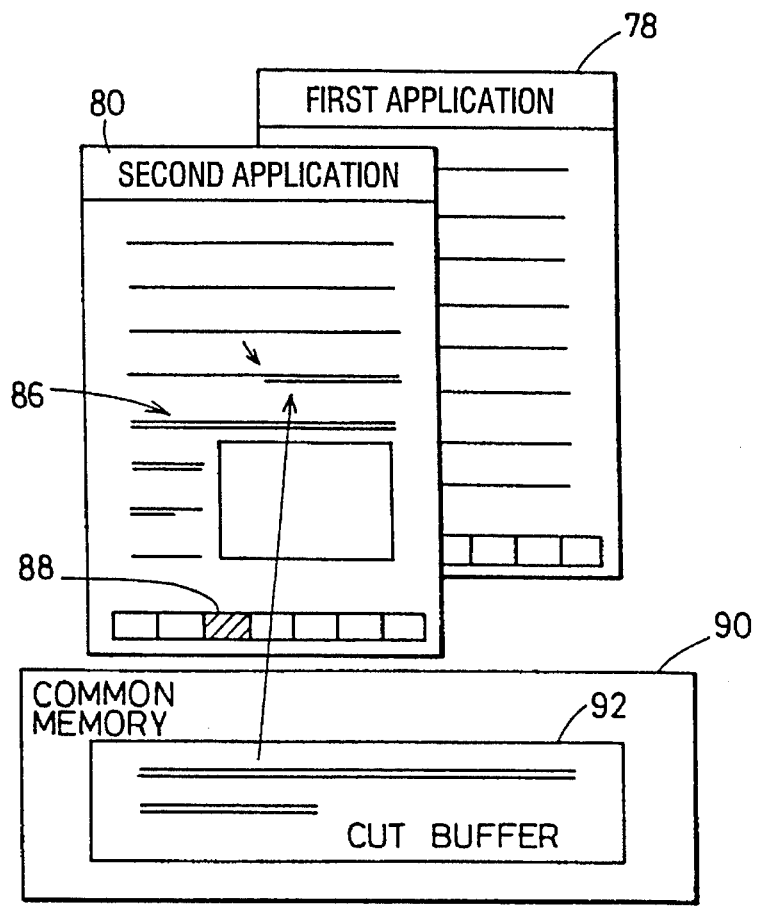
Figure 4:
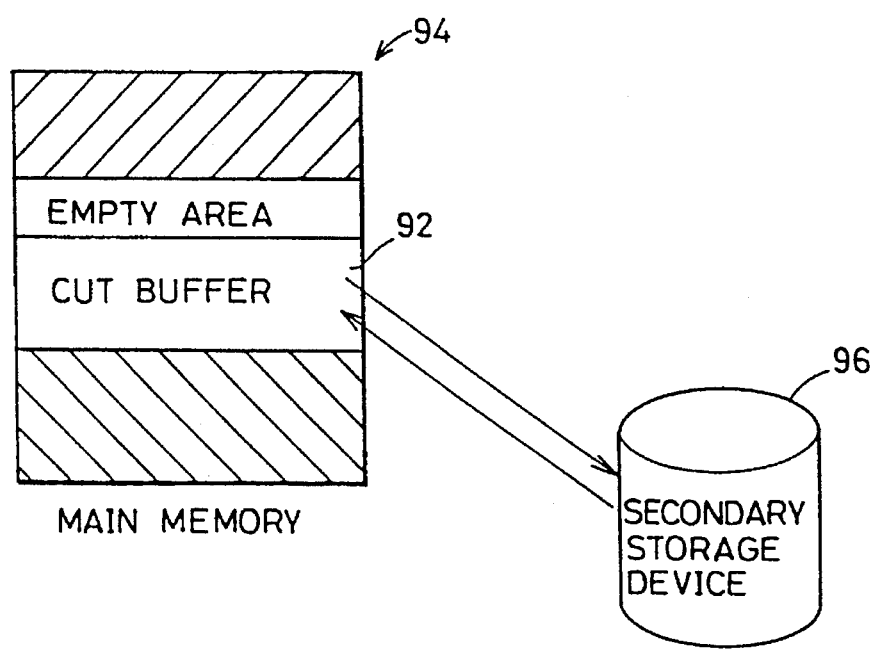
FIG. 4 schematically shows a conventional method of extending a cut buffer.
Figure 5:
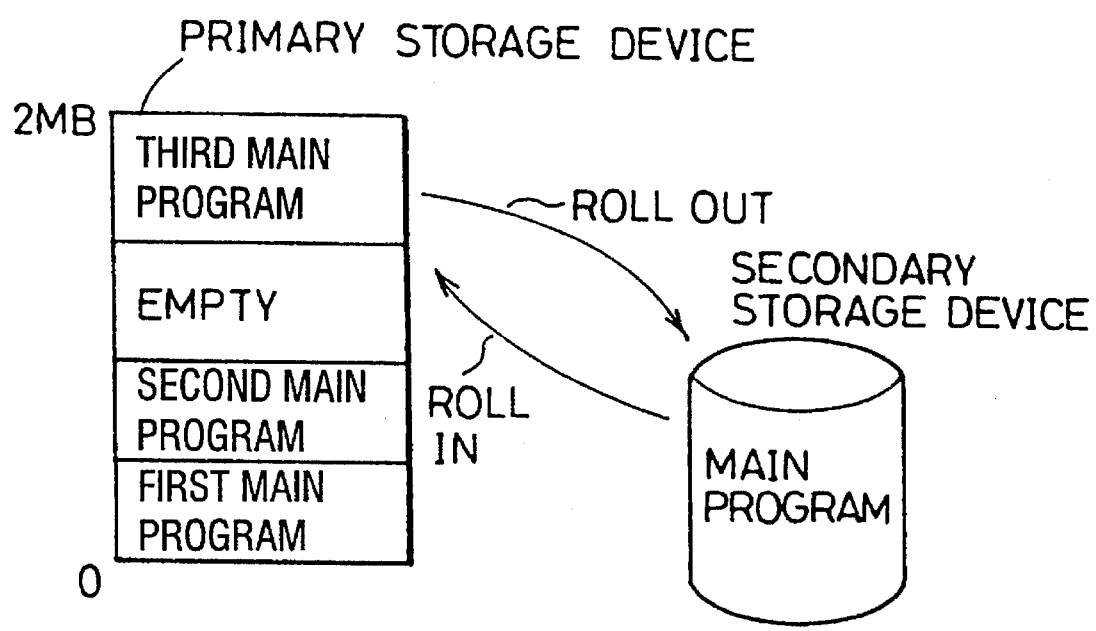
FIG. 5 is a diagram for describing a conventional roll in/roll out method.
Figure 6:
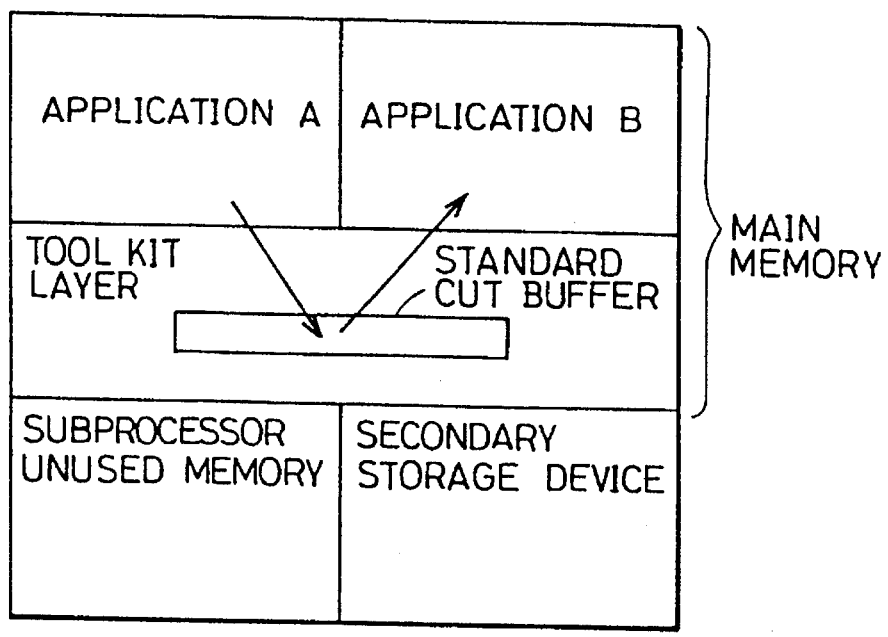
FIGS. 6 and 7 schematically show a software structure for describing a first embodiment of the present invention.
Figure 7:
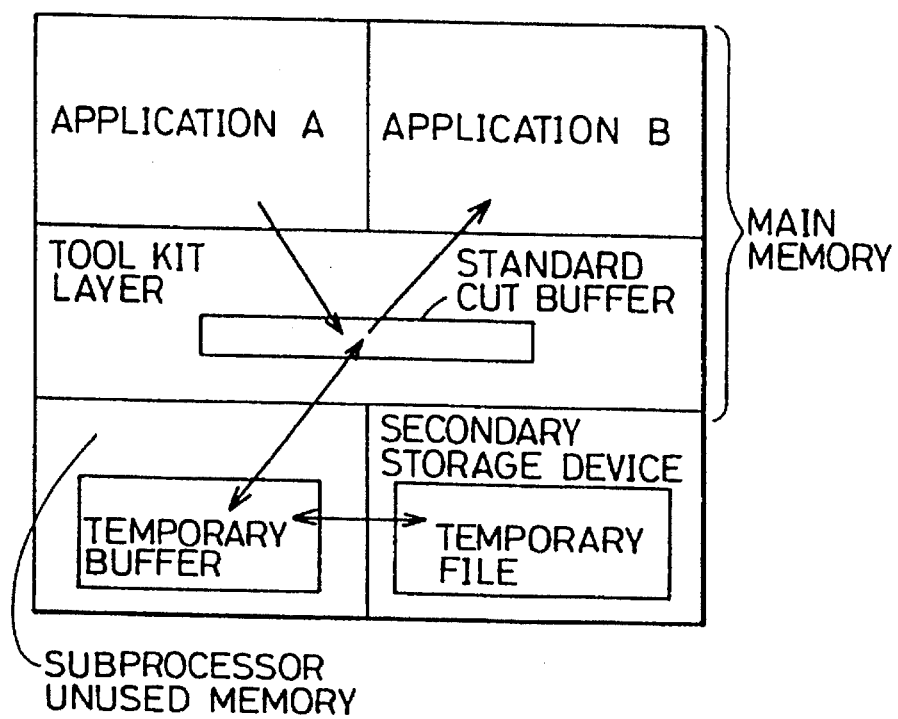

The concept of a cut buffer used in a data exchange control method between applications according to the present invention will be described with reference to FIGS. 6 and 7. Referring to FIG. 6 where data exchange is carried out between applications A and B operating on a main memory, either of the applications request allocation of a cut buffer with respect to a software group called a tool kit layer of the system side. An area is prepared in advance that is used for ensuring temporarily a storage area called a heap region at the time of executing an application. The heap area has a standard cut buffer reserved therein. If the standard cut buffer has a size sufficient for data exchange, data temporarily stored in the standard cut buffer is read out by application B to carry out data exchange.

In general, a large heap area cannot be kept for the system, so that the capacity of the standard cut buffer is accordingly reduced. Some applications may request a cut buffer of a capacity exceeding that of a standard cut buffer. In such a case, a temporary file is not immediately created in a secondary storage device as in the conventional case, and an unused memory under the control of a subprocessor in the system is searched. If there is an area that can be used, a temporary buffer is reserved in the unused memory of that subprocessor to be used as a cut buffer. At times when even this temporary buffer does not provide sufficient capacity, a temporary file is prepared in the secondary storage device, whereby a standard cut buffer, a temporary buffer, and a temporary file provided in the secondary storage device are used as the cut buffer.

When the capacity of the standard cut buffer preserved in the main memory is not sufficient in, for example, a multiprocessor system, the unused memory in a subprocessor is first used to carry out extension of a cut buffer. This gives the advantage of increasing the data exchange speed using a cut buffer by the efficient utilization of the memory with the current hardware. An image buffer provided in a graphic processor as indicated in the following embodiment is often left unused when there is no character or image input in spite of having a large capacity. In the present embodiment, it is expected that such unused memory of an image buffer and the like can be used more efficiently to improve the data exchange speed without increasing the cost.

By using a format identical to that of a general file for data to be exchanged in such a data exchange operation, data exchange utilizing a memory and file readout can be integrated. This means that data exchange by files and data exchange using a memory between applications can be realized by the same method. More specifically, an unused memory of a subprocessor can be used not only for data exchange between applications, but as a temporary buffer for file exchange.

This idea can be used not only for two applications operating on the same device, but for memory utilization external of the equipment using a network. More specifically, data exchange using a network can be realized by utilizing an unused memory residing in any equipment connected to the network.

If there are many unused memories that can be utilized in the system, the secondary storage device is less likely to be used as a temporary file. Therefore, such a data exchange system can be particularly used efficiently in a multiprocessor system and in a network where many devices are connected thereto.

Figure 8:
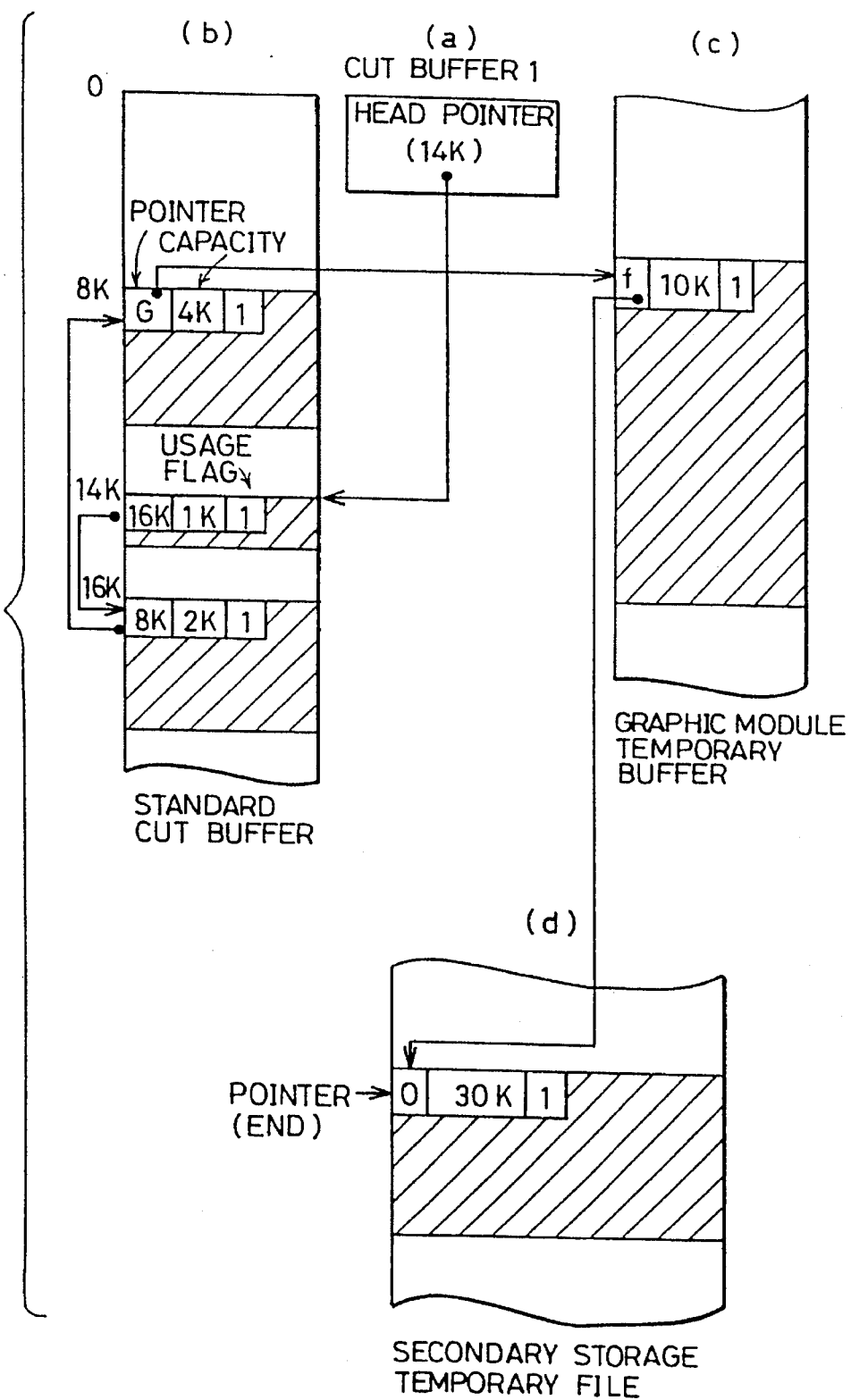
FIG. 8 schematically shows the linking status of an extended area in extending a cut buffer according to the first embodiment of the present invention.

FIG. 8 is a another representation of the idea of the data exchange system according to the present invention. Referring to FIG. 8, when there is a request for reserving a cut buffer, the standard cut buffer in the main memory is first used as the cut buffer as shown in FIG. 8(b). Access to this cut buffer is carried out according to the head pointer provided for a cut buffer 1. The pointer shown in FIG. 8 (a) indicates address 14K of the main memory. By referring to this address of the main memory, the access proceeds to the beginning of the standard cut buffer. This standard cut buffer can be extended several times as shown in FIG. 8 (b). The cut buffer shown in FIG. 8 has a extended area of a variable length. The present invention is applicable not only to that extending a standard cut buffer of a variable length, but also to one that reserves a cut buffer in a fixed length as in an embodiment that will be described afterwards.

When no more area can be reserved for the cut buffer in the main memory, a temporary buffer using an unused memory of a subprocessor (for example, the processor of a graphic module) other than the main processor connected to the system is reserved. If the capacity is still not sufficient even with the temporary buffer of a graphic module, a temporary file in a secondary storage is reserved as shown in FIG. 8 (d). The standard cut buffer of the main memory, the temporary buffer of the graphic module, and the temporary file of the secondary storage are logically connected to each other using a pointer, as shown in FIG. 8.

The case of using a memory connected to a subprocessor will be taken as an example in the above-described idea of the present invention and the embodiments that will be described later. However, the present invention is not limited to this, and may be applied to the common memory between a processor and another device, and also to a high speed file of a semiconductor memory termed an IC card and a RAM disk. Although data exchange is taken as an example, an exchange of the program itself as data can also be realized under the same process.

An embodiment of the present invention will be described in detail with reference to FIGS. 9–17. An embodiment of practicing the present invention for a document processing dedicated work station (referred to as WS hereinafter) of a multiprocessor structure of a hierarchy type will be described. However, the present invention is not limited to this, and can be applied to a common memory between a processor and other types of equipment, and to a system having a high speed file connected besides the main memory.

Figure 9:
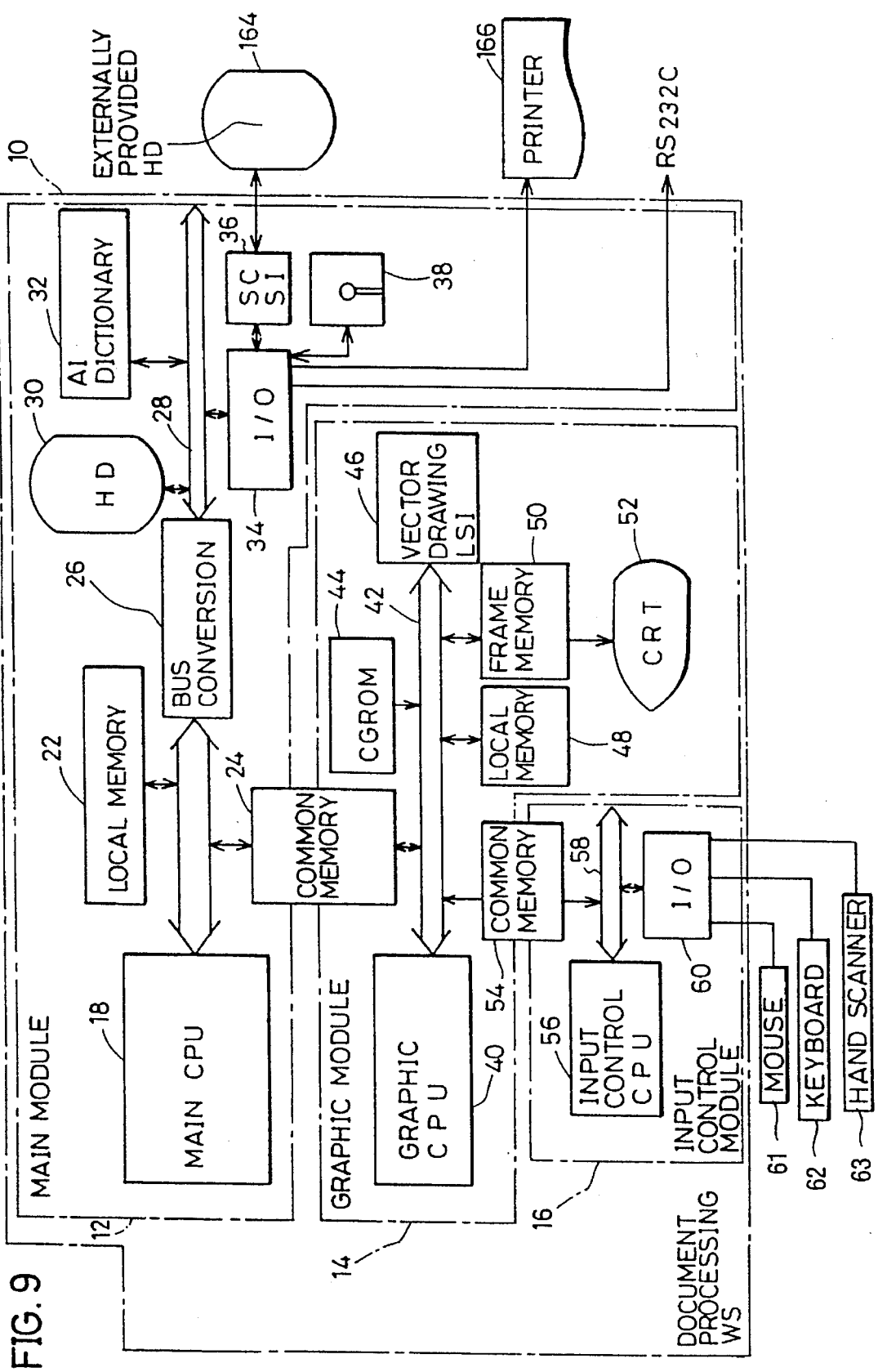
FIG. 9 is a block diagram of a document processing dedicated WS according to the first embodiment of the present invention.

Referring to FIG. 9, a document processing 10 includes a main module 12 for carrying out document editing, file processing and communication processing, a graphic module 14 for the processing of the window system, font management, outline font drawing, and display control, and an input control module 16 for controlling the input process of a user by means of a keyboard, a mouse, a hand scanner and the like.

A bi-accessible common memory 24 is provided between main module 12 and graphic module 14. A bi-accessible common memory 54 is provided between graphic module 14 and input control module 16.

Main module 12 includes a main CPU (Central Processing Unit) 18 for document editing, file processing, communication processing and the like, an internal bus 20 connected to main CPU 18, a local memory 22 of main module 12 connected to internal bus 20, a bus 28 in accordance with the regulations used in a general personal computer for ensuring extension of the system, and a bus conversion circuit 26 for carrying out bus conversion between bus 20 and bus 28. A hard disk 30, an AI dictionary 32, and an I/O interface 34 are connected to bus 28. A 3.5 inch disk drive 35, and a SCSI (Small Computer System Interface) 36 are connected to I/O interface 34. An externally provided hard disk is connected to SCSI 36. I/O interface 34 has a printer connected and a RS232C input/output interface provided. Common memory 24 is connected to internal bus 20. Main module 12 is loaded with a event driving type pseudo multi task monitor for facilitating communication processing.

Graphic module 14 includes a graphic CPU 40 for controlling a CRT (Cathode Ray Tube) of a large screen high resolution which will be described afterwards and for operating the window system at a high speed, an internal bus 42 connected to graphic CPU 40, a CGROM (Character Generator Read-Only Memory) 44 connected to internal bus 42 for storing fonts of high frequency including an outline font, a vector drawing LSI (Large Scale Integrated Circuit) 46 connected to bus 42, a local memory 48, and a frame memory 50. A vertical type 17 inch CRT of high resolution (1400×1900 dots) 52 that can display one whole page of a A4 size in a WYSIWYG (What You See Is What You Get) manner is connected to frame memory 50. Common memories 24 and 54 are also connected to internal bus 42. Graphic module 14 is provided with graphic CPU 40 and vector drawing LSI 46, whereby graphic module 14 can process a large amount of data in high speed for display in a structure adequate for processing bit map data.

Input control module 16 includes an input control CPU 56 for input control, an internal bus 58 connected to input control CPU 56, and an I/O interface 60 connected to bus 58. The mouse 61, keyboard 62, hand scanner 63 and the like are connected to I/O interface 60. Common memory 54 is connected to internal bus 58. Input control module 16 executes the program for input/output control downloaded from a system of a higher level (main module 12 or graphic module 14) so that it allows the conventional input method to be used while it can be readily adapted and to a new device.

This architecture of stacking in a hierarchical manner a plurality of modules from the module closest to the input and allocating a common memory therebetween can create a problem as set forth example.

A work station employing a single processor and a single bus structure is operated to provide high response (for example, input process by a mouse) for heavy loads (for example, editor edition process). Therefore, there is a problem that the operation or response of a work station cannot easily be predicted by the processing content and performance between applications. Furthermore, a high speed window system was indispensable for dealing with the so-called multimedia.

The multimodule structure shown in FIG. 9 solve this problem. More specifically, various processes ranging from data processing of a large capacity such as an image to the processing of a high response request such as mouse control can be addressed by dividing each process by a hierarchical structure with bus multiplex allocating a bus in each processing module.

In the following, a system according to the present invention will be described with reference to FIGS. 10–17 for data exchange using a cut buffer between applications.

For the sake of simplicity, the system of reserving directly the cut buffer capacity requested by an application will be described in the following. However, the present invention is not limited to such a system, and may be applied to a structure for reserving an extended area in pages or segments such as that carried out in a virtual storage system and for track buffering such as that carried out in disk cache (in accessing a portion of data in a track, not only that data, but all the data in that track containing that data are temporarily stored in a buffer).

Referring to FIGS. 9 and, the storage media used in the following will first be described. A standard cut buffer 62 is reserved in a local memory 22 in main module 12. A cut buffer management table 64, and first, second, and third cut buffers of a fixed length (each of 3KB) are provided in standard cut buffer 62.

The primary extended area of standard buffer 62 utilizes the buffer area for printing that is prepared in graphic module 14. In document processing system 10 shown in FIG. 9, the printer buffer is allocated in common memory 24. The buffer for printing has a large area of more than 4 MB for carrying out printing of an A3 size of 400 dots per inch. This printer buffer is used only at the time of printing and is generally unused. By utilizing common memory 24 as a printing buffer and for the first extended area of a standard cut buffer, the effect of the present invention can be exhibited distinctly. A temporary file will be reserved in hard disk 30 (refer to FIG. 9) only when the extended area in common memory 24 is not sufficient or when an extended area in common memory 24 cannot be reserved.

Figure 11:
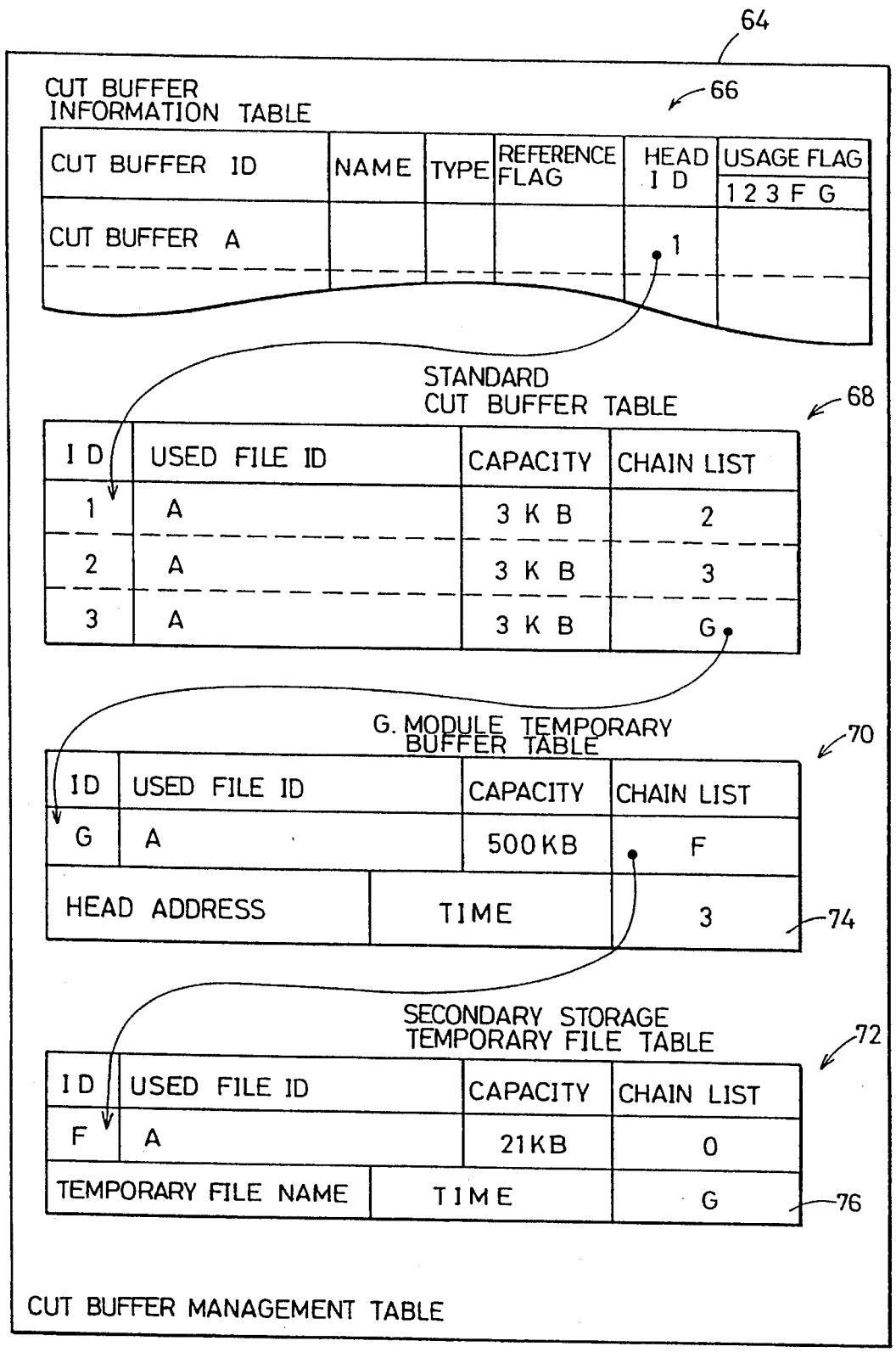
FIG. 11 schematically shows a management table of a cut buffer.

Referring to FIG. 11, cut buffer management table 64 includes a cut buffer information table 66 for storing information related to the used cut buffer, a standard cut buffer table 68 for storing information related to first-third cut buffers prepared as a standard cut buffer of the cut buffers, a graphic module temporary buffer table 70 for storing information relating to the temporary buffer reserved in the graphic module, and a secondary storage temporary file table 72 for storing information relating to a temporary file reserved in a secondary storage device such as a hard disk.

Stored in cut buffer information table 66 are a cut buffer ID (identifier) for identifying a reserved cut buffer, the name of each cut buffer, the type of each cut buffer, a reference flag for indicating whether each cut buffer is referred to or not by the application during a predetermined time period, an ID of the head cut buffer of the standard cut buffer allocated for each cut buffer, and usage flags for indicating which of the standard first-third cut buffers, the secondary storage temporary file and the graphic module temporary buffer is used as the cut buffer. For example, if "1" is stored as the head ID, the beginning of the corresponding cut buffer starts from standard cut buffer 1.

Standard cut buffer table 68 stores the ID (identifier) of each standard cut buffer, the identifier (usage file ID) using that standard cut buffer, the capacity of each standard cut buffer, and a chain list for indicating the next extended area (a standard cut buffer, the graphic module temporary buffer, or the secondary storage temporary file) when each standard cut buffer does not provided sufficient capacity. An ID specifying each extending area is stored in each chain list. For example, the storage of "G" in the field of the chain list indicates that the area is extended from the standard cut buffer to the temporary buffer of the graphic module.

Graphic module temporary buffer table 70 stores the ID (identifier) for specifying that temporary buffer, the ID (usage file ID) of the file using that temporary buffer, the capacity of the reserved temporary buffer, the chain list information indicating the ID of the area to be extended in the case of further extension when the capacity of this temporary buffer is insufficient, the head address in common memory 24 (refer to FIG. 9) of the temporary buffer, the date when this temporary buffer was reserved, and a backward pointer 74 indicating the preceding extended area used before that temporary buffer. For example, the storage of "F" in the chain list information indicates that the area is further extended to the temporary file of the secondary storage.

Similar to graphic module temporary buffer table 70, secondary storage temporary file table 72 stores an ID for identifying the file, a usage file ID, the capacity, a chain list, the name of the temporary file, the date when this temporary file was reserved, and a backward pointer 76. The storage of "0" in the chain list information indicates that there is no area further extended from this area.

Figure 10:
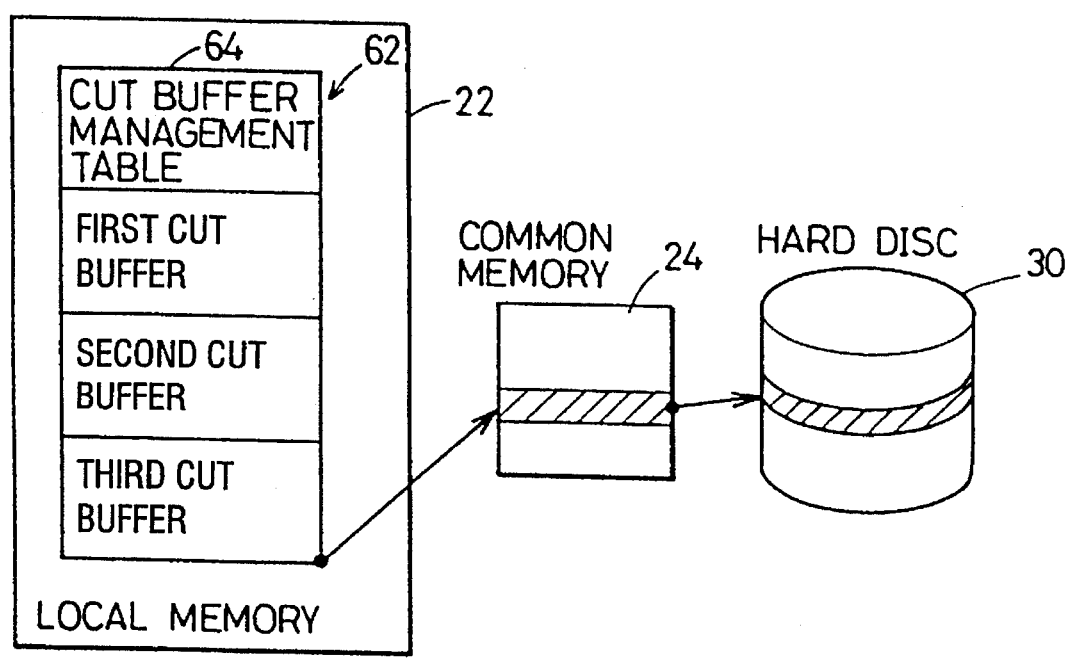
FIG. 10 schematically shows the reservation state of an extended area of a cut buffer according to the first embodiment of the present invention.

Referring to FIGS. 12–17, the operation of document processing system 10 shown in FIGS. 9–11 according to the present invention will be described hereinafter.

Figure 12:
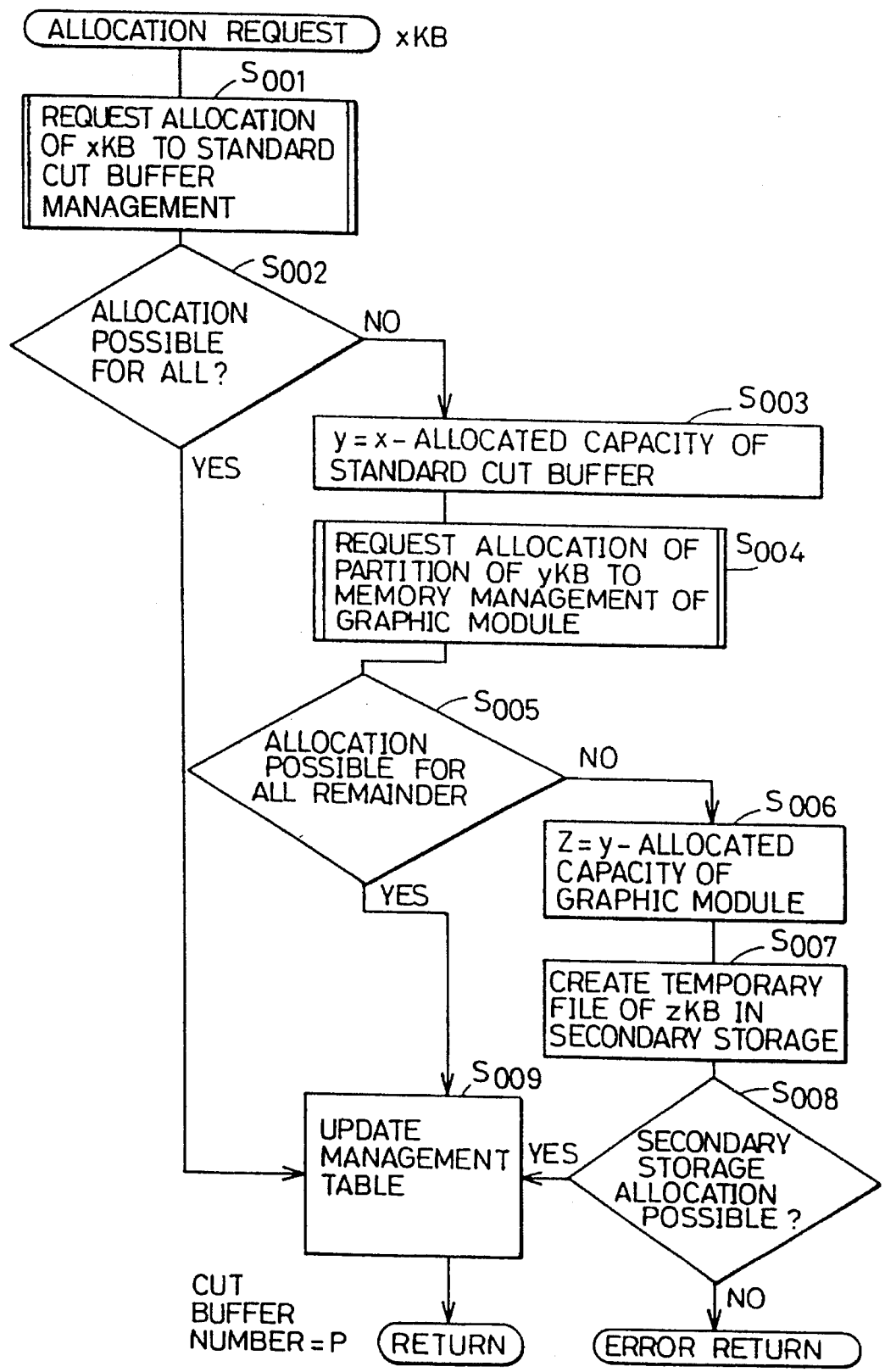
FIG. 12 is a flow chart for allocating a cut buffer according to the first embodiment of the present invention.
Figure 13:
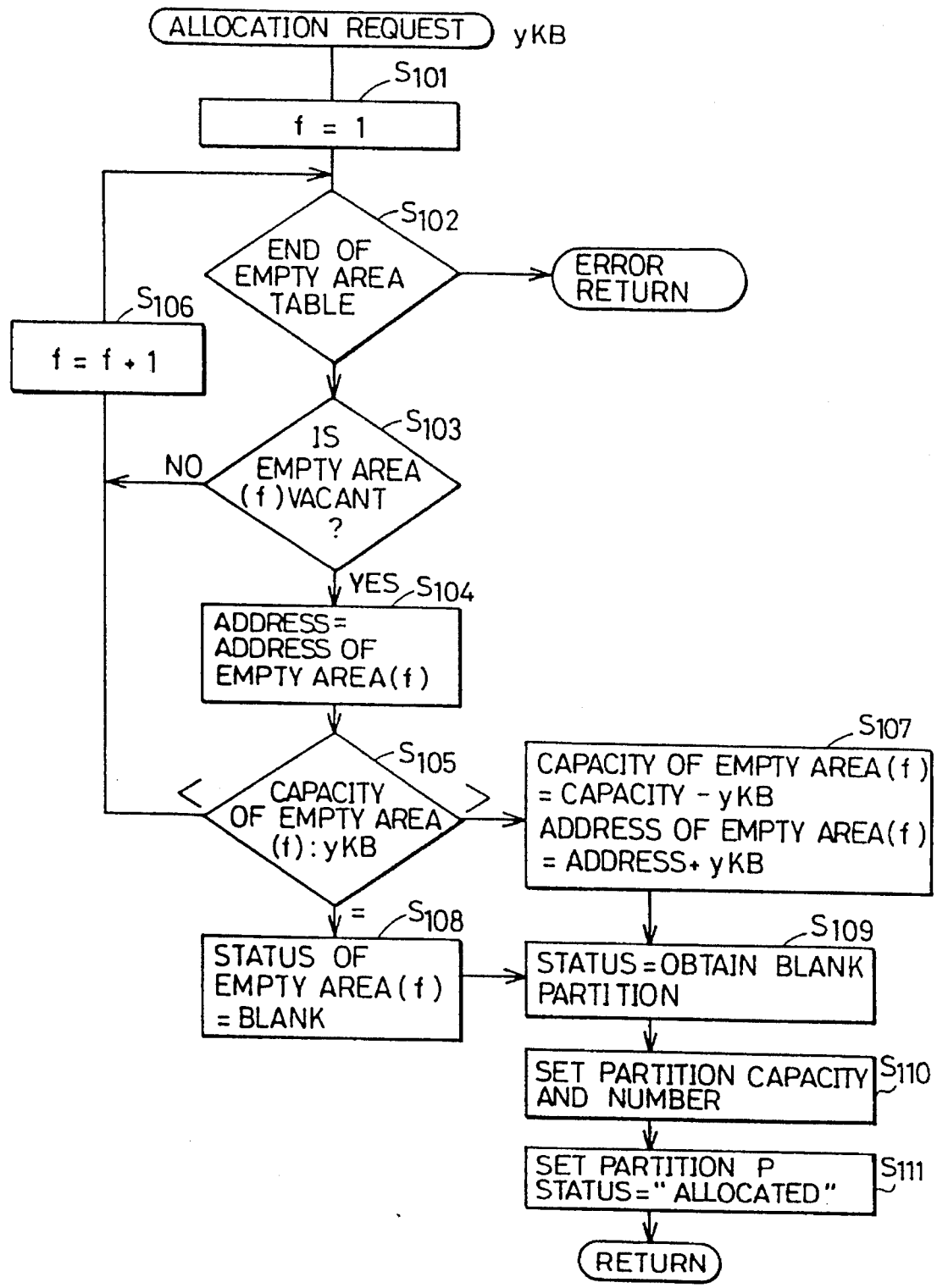
FIG. 13 is a flow chart of extending a predetermined capacity extent in a common memory according to the first embodiment of the present invention.
Figure 14:
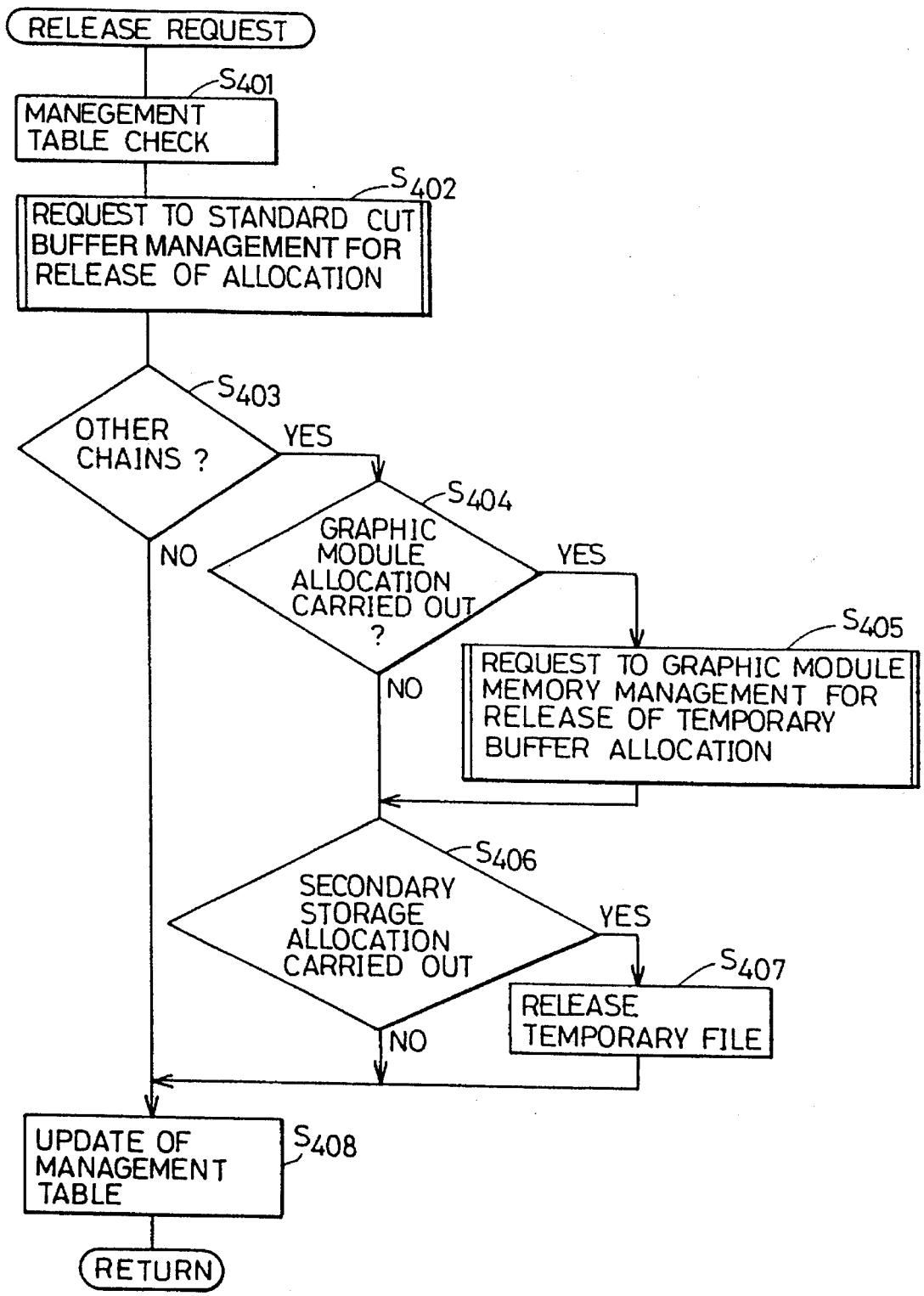
FIG. 14 is a flow chart of releasing a cut buffer reserved according to the first embodiment of the present invention.
Figure 15:
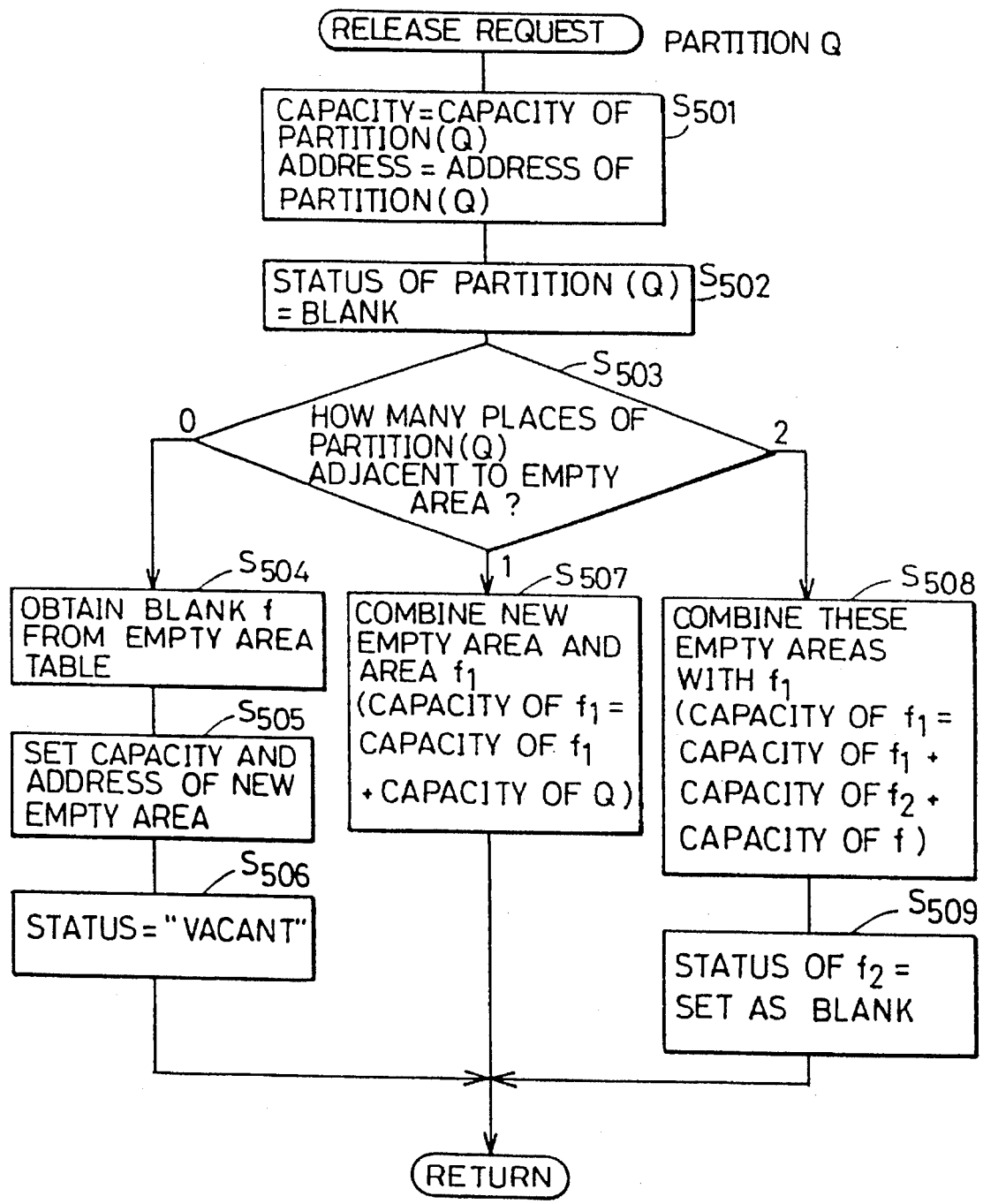
FIG. 15 is a flow chart of releasing a predetermined partition Q in a graphic module.
Figure 16:
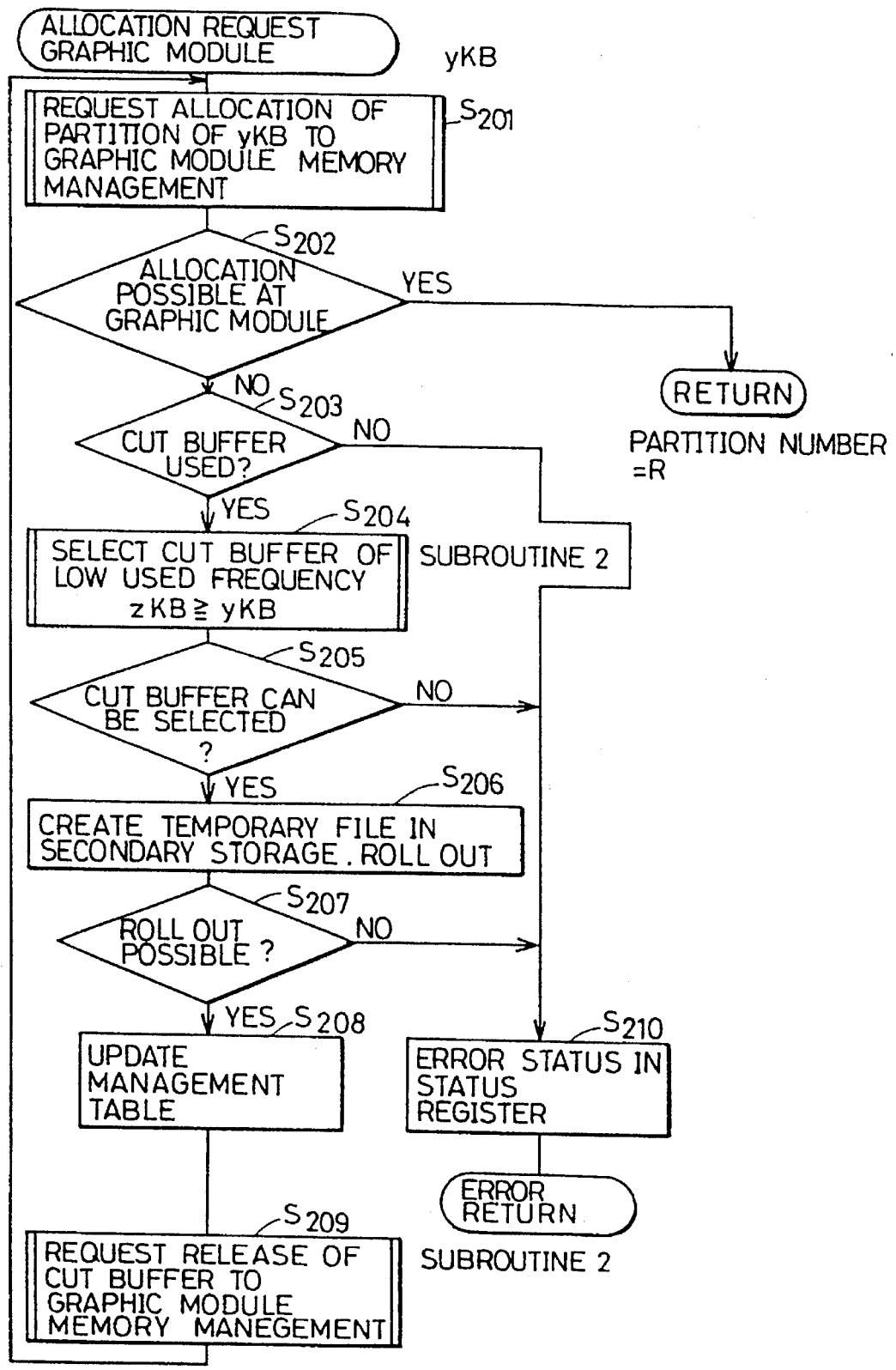
FIG. 16 is a flow chart indicating a memory allocation method when there is a request of allocation of a partition of a predetermined capacity from a graphic module.
Figure 17:
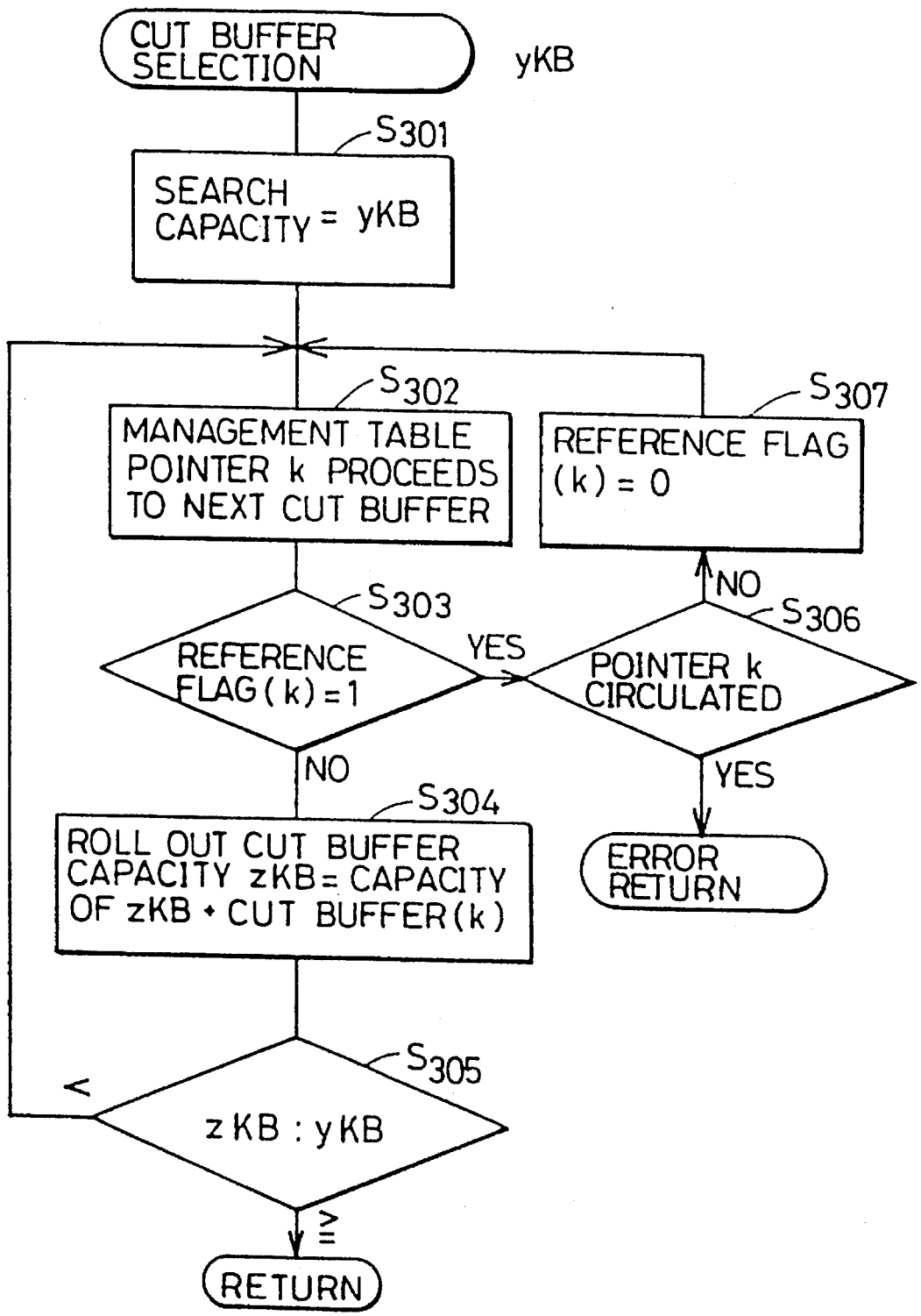
FIG. 17 is a flow chart of the process for selecting a cut buffer to be rolled out for an allocation request from a graphic module.

FIGS. 12 and 13 show the flow charts in achieving a cut buffer of a predetermined capacity (xKB). FIGS. 14 and 15 show the flow chart of releasing a cut buffer that was obtained. FIGS. 16 and 17 show the flow charts of reserving an area of yKB in common memory 24 from graphic module 14 when an extended area of the cut buffer is reserved in common memory 24 by main module 12.

Referring to FIG. 12 where an allocation request of a cut buffer of xKB is generated, an allocation of an area of xKB is requested for a standard cut buffer management in step S (referred simply as S hereinafter) 001.

At S002, determination is made whether all the area of xKB can be allocated by the standard cut buffer according to the result of the process of S001. If allocation is possible, the process proceeds directly to S009, otherwise to S003.

At S003, calculation of a capacity yKB for allocation requested to the graphic module is carried out by the following equation:

$$y = x - \text{allocated capacity of standard cut buffer}$$

At S004, allocation of a partition of capacity yKB determined at S003 is requested by a subroutine to the memory management of the graphic module.

At S005, determination is made whether all the remaining area of yKB out of the allocation requested xKB is possible in the memory of the graphic module according to the result of process S004. If allocation is possible, the process proceeds directly to S009, otherwise to S006.

At S006, a capacity zKB of a temporary file in requesting a creation of a temporary file for a secondary storage management is calculated by the following equation:

$$z = y - \text{graphic module allocation capacity}$$

At S007, a process for creating a temporary file of capacity zKB is carried out in the secondary storage (hard disk 30).

At S008, determination is made whether the creation of a temporary file of capacity zKB was possible in the secondary storage as result of the process of S007. If allocation is possible, the process proceeds to S009, otherwise the process returns with an error status since an area of xKB could not be reserved.

At step S009, respective management tables (refer to FIG. 11) for the standard cut buffer, the graphic module temporary buffer, the temporary file of the secondary storage are updated. Following the management table update of S009, the process returns to the main routine with P as the cut buffer number.

FIG. 13 is a flow chart of the subroutine of S004 of FIG. 12. The process of S001 can be carried out similarly. Referring to FIG. 13, when allocation request is generated of a partition of yKB for the memory management of the graphic module, an initial value of 1 is inserted in the variable f at station S101. The variable of f indicates the position in the empty area table prepared in the memory management of the graphic module.

At S102, determination is made whether the position in the empty area table represented by variable f is the end of the empty area table. If the end of the empty area table is reached, this subroutines returns with an error status since the required area could not be reserved up to this process.

If not at the end of the empty area table, the process proceeds to S103 where determination is made whether the f-th empty area is currently vacant or not. If not vacant, the process proceeds to S106, otherwise to S104.

At S104, a process of setting the address of the newly allocated partition to the address of the f-th empty area is carried out.

At S105, determination is made whether which of the capacity of the f-th empty region or the capacity of yKB is greater. If the capacity of yKB is greater, the process proceeds to S106. If both are equal, the process proceeds to S108. If the capacity of the f-th empty area is greater than yKB, the process proceeds to S107.

Because the allocation of yKB is not yet finished in the search up to the f-th empty area at S106, variable f is incremented by 1, and the process returns to S102 to repeat the appropriate process.

When the capacity of the f-th empty area is equal to the requested allocation capacity of yKB, the process proceeds to S108. At S108, the status of the f-th empty area in the empty area table is set to a blank, and the control proceeds to S109.

With the process proceeds to S107 according to the determination result of S105, the process of setting a new capacity for the f-th empty area by subtracting yKB from the capacity of the f-th empty area, and the process of increasing the address of the f-th empty area by yKB are carried out. Thus, a status is established where the first half of yKB of the f-th empty area is used as the extended area of the cut buffer, and the empty area is reduced to the remaining area. After the process of S107, the control proceeds to S109.

At S109, a partition P having a blank status in the temporary buffer table of the graphic module is obtained. At S110, the process for setting the capacity and the head address in the column of the obtained partition is carried out. At S111, the process of setting the status of partition P to an "allocated" state is carried out. Then, this subroutine returns to the main routine.

Although the process of FIG. 13 is described taking the process of S004 as an example, a similar process is also carried out in S001.

FIG. 14 is a flow chart of releasing the area of the reserved cut buffer. If a request for release is made, a process of checking cut buffer management table 64 (refer to FIG. 11) is carried out at S401.

At S402, the process of requesting a release of an area allocated in the cut buffer is carried out for the standard cut buffer management. The standard cut buffer used as a cut buffer which becomes unnecessary is released.

At S403, determination is made whether there are chains other than the standard cut buffer. When there are no other chains, the process proceeds directly to S408, otherwise to S404 since those areas must be released.

At S404, determination is made whether there is a temporary buffer allocated for the graphic module. If there was no allocation, the process directly proceeds to S406, otherwise to S405. At S405, the process for requesting release of the allocated temporary buffer is carried out for the graphic module memory management. As a result of this request, the temporary buffer reserved in the graphic module is released according to a process of a subroutine that will be described afterwards. After S405, the process proceeds to S406.

At S406, determination is made whether there is an area that is allocated as a temporary file in the secondary storage. If there was no allocation, the process directly proceeds to S408, otherwise to S407. The temporary file is released at S407. After S407, the process proceeds to S408.

At S408, a process to update the management table is carried out according to the above executed process. Then, the control returns to the program that called this procedure.

FIG. 15 is a flow chart of releasing a temporary buffer in response to a request for releasing a temporary buffer carried out in S405 of FIG. 14. It is assumed that the release of a partition Q is requested in the following description. At S501, the capacity and the address of partition Q are respectively stored as the capacity and the address.

At S502, a process for setting the status of partition Q to a blank is carried out.

At S503, determination is made of how many places of partition Q are adjacent to an empty area. If partition Q is not adjacent to an empty area, the process proceeds to S504. If either the beginning or the end of partition Q is adjacent to an empty area, the process proceeds to S507. If partition Q has both its beginning and its end adjacent to an empty area, the process proceeds to S508.

At S504, a process for obtaining a blank column, (assumed to be f) in the empty area table provided in the memory management of the graphic module is carried out.

At S505, the process of setting the capacity and address of the new empty area is carried out in the f-th column of the empty area table.

At S506, a process of setting a status of "vacant" for the new empty area is carried out, whereby this subroutine is completed.

If the process proceeds from S503 to S507, a process of combining the new empty region with the empty region $f_1$ adjacent to the empty area is carried at S507. More specifically, the process of adding the capacity of the new empty area (partition Q) to the capacity of the empty area $f_1$ adjacent to the new empty area is carried out, whereby this subroutine is completed.

When the process proceeds to S508 from S503, the process of combining the empty area with either of the two empty areas $f_1$ and $f_2$ adjacent to partition Q, for example $f_1$, is carried out. More specifically, the process of adding the capacity of $f_2$ and the capacity of the newly generated f-th partition Q to the capacity of $f_1$ is carried out.

At S509, the process of setting the status of the other empty region $f_2$ to a blank is carried out. This subroutine is completed succeeding S509. By the processes of S508 and S509, the two empty areas $f_1$ and $f_2$ sandwiching partition Q are integrated into one empty region $f_1$ with partition Q. A similar process is carried out in S402.

By the process shown in FIGS. 12–15, the process of reserving a cut buffer for data exchange between applications in the order of a local memory 22, a common memory 24, and a hard disk 303, and also the process of releasing an allocated area when it becomes unnecessary are carried out.

There may be a case where a graphic module 14 newly requests allocation of a predetermined area in common memory 24. This process is carried out as follows.

Referring to FIG. 16 where allocation of a storage area of yKB is requested from a graphic module, allocation of a partition yKB is requested for a memory management of the graphic module at S201.

At S202, determination is made whether the partition yKB is allocatable in the graphic module. If allocation is possible, the number of that partition is set as R, and the control returns. When the graphic module has a portion used such as a cut buffer by the main module and allocation of a partition of yKB is not possible, the process proceeds to S203.

At S203, determination is made whether common memory 24 is used as a cut buffer. If there is no usage of a cut buffer according to the result of the determination, the process proceeds to S210 because it is possible to produce a usable area. At S210, an error status is set in the status register to return. If a cut buffer is used, an area of yKB can be created by rolling out any of the used cut buffer into a secondary storage. This is carried out in the process of S204 et seq.

At S204, the process of selecting a cut buffer of low frequency from the cut buffer provided in the common memory is carried out. Here, the requirement that the total capacity zKB of the selected cut buffer is greater than the requested yKB must be met. At S204, selection of a cut buffer by an algorithm that will be described afterwards with reference to FIG. 17 is carried out.

At S205, determination is made whether it was possible to select a cut buffer to be rolled out according to the result of the process of S204. If selection was not possible, the process proceeds to S210 since a new partition could not be produced. At S210, the status register is set to an error status to return. If selection of a cut buffer satisfying the requirement was possible, the process proceeds to S206.

At S206, a temporary file is created in a secondary storage such as a hard disk. A process of rolling out the cut buffer selected according to the result of the process of S204 is carried out in this temporary file. Then the process proceeds to S207.

At S207, determination is made whether is was possible to roll out the selected cut buffer according to the result of the process of S206. If there is already no empty area in the secondary storage and it was impossible to create a temporary file, roll out cannot be carried out. In this case, a new partition that can be used cannot be created in the common memory, and the process proceeds to S210 where an error status is set in the status register for return. If roll out is possible, the process proceeds to S208.

At S208, the process of updating information relating to the rolled out cut buffer is carried out in the management table.

At S209, the process of requesting a release of the cut buffer area rolled out in S206 is carried out for the memory management of the graphic module. This process can be carried out according to the process similar to that described with reference to FIGS. 14 and 16. As a result of the process of S209, the selected cut buffer is released as an empty region in the common memory. Following the process of S209, the control returns to S201, whereby the process of S201 et seq. is carried out.

In the newly carried out process of S201 et seq., an area of yKB can be allocated for the graphic module because an empty area of sufficient size is already created in the common memory.

FIG. 17 is a flow chart of the process of selecting a cut buffer carried out in S204 of FIG. 16. The algorithm shown in FIG. 17 is carried out according to a simple LRU (Least Recently-Used) method. According to this algorithm, the cut buffer that has not been used for the longest time period is selected.

Referring to FIG. 17, a process of setting the allocation request of yKB as the capacity to be searched is carried out in S301.

At S302, the pointer k for referring to each cut buffer in order in the management table is set from the current value to the next cut buffer. If this search proceeds to the last cut buffer in the management table, the pointer k progresses to the head cut buffer.

At S303, determination is made whether the reference flag of the cut buffer designated by the current pointer k (refer to the cut buffer information table of FIG. 11) is "1" or not. This reference flag is cleared to 0 in the preceding process of a cut buffer selection. "1" is set when a reference is made to this cut buffer from an application program. Therefore, if the determination result is YES at S303, the corresponding k-th cut buffer is at least not used since the preceding cut buffer selection process, and will not be the subject of roll out. In this case, the process proceeds to S306. At S306, determination is made whether the pointer k has rounded the cut buffer information table of the management table. If one circulation has been made, it means that a cut buffer that can be rolled out was not found since all the cut buffers were used from the preceding cut buffer selection process to the current cut buffer selection process. An error status is set and the control returns to the former routine. If the pointer has not yet made one circulation, the process proceeds to S307.

At S307, a process is carried out to clear the field of the reference flag of the k-th cut buffer to 0. Then, the process proceeds to S302.

When the reference flag of the cut buffer specified by pointer k is 0 according to the result of the determination in S303, the process proceeds to S304. At S304, a process of adding the capacity of the cut buffer specified by pointer k to the capacity zKB of the cut buffer than can be rolled out is carried out. This capacity zKB is cleared to 0 in the cut buffer selection process.

At S305, a comparison is carried out between zKB obtained as a result of calculation in S304 and the allocation requested yKB. If zKB is still lower than yKB according to the comparison, the process returns to S302 because all the allocation requested capacity is still not obtained. Then, the process of S302 et seq. is repeated. If zKB is greater than or equal to the allocation requested yKB, the process returns to the original routine since the allocation requested area of yKB can be released by rolling out all the selected cut buffers.

Thus, the process of reserving a temporary buffer for a cut buffer using a common memory and the process of reserving a required area in a common memory when necessary at the graphic module can be carried out quickly and reliably of course, the present invention is not limited to the above first embodiment described in details. In the above embodiment, a temporary buffer is created in a memory common to the graphic module prior to reserving a temporary file in a secondary storage (hard disk). However, any area in a storage medium such as a memory connected to the system and that has an access speed higher than that of a hard disk may be provided as the area for reserving a temporary buffer. When the system is connected to a network, it is also possible to carry out data exchange between applications that operate on the network using this method.

According to the first embodiment in which an extended area for data exchange is reserved, an area is first reserved in a second storage means accessible at a high speed before a third storage means such as a secondary storage medium of low access speed, and an extended area is reserved at a third storage means only when the capacity of the second storage means is insufficient. The need to access a third storage means that takes a long access time is reduced in exchanging data of large capacity to improve the data exchange speed. There is also an advantage of implementation using a conventional hardware, so that the cost of the device is not unnecessarily raised.

Second Embodiment

A second embodiment of the present invention will be described in details with reference to the drawings.

Figures 18, 19:
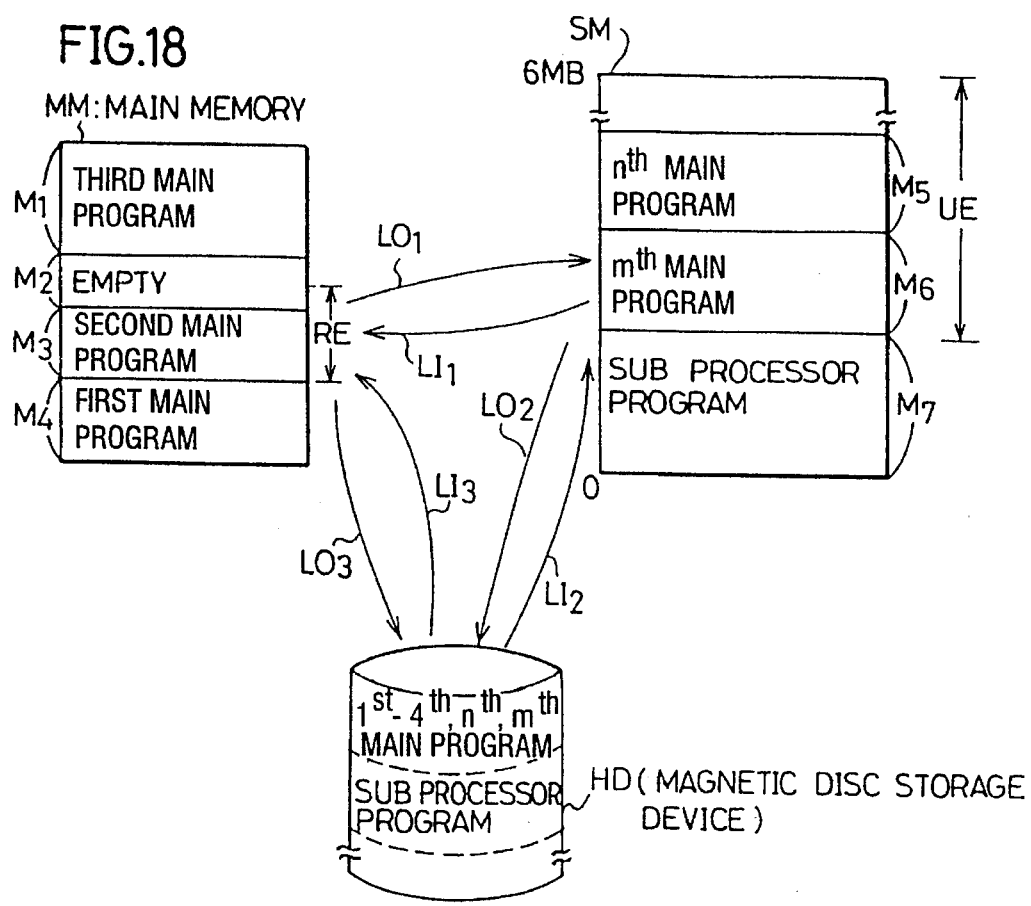
FIG. 18 is a diagram for describing a control method at the time of memory area utilization in an information processor according to a second embodiment of the present invention.
FIG. 19 is a diagram indicating in correspondence the area usage status and the program roll in/roll out status at the time of memory area utilization shown in FIG. 18.

FIG. 18 is a diagram for describing a control method of utilization of a memory area in an information processor according to a second embodiment of the present invention.

FIG. 19 shows a correspondence of the usage status of the area of the memory shown in FIG. 18 to the roll in/roll out status of the program.

The information processor according to the present embodiment carries out process by using unused regions in the memory in the device as the area for rolling out programs and data.

The control method is schematically described when using a memory area in an information processor according to the present invention with reference to FIG. 18.

The information processor employing the control method shown in FIG. 18 employs a multiprocessor structure.

Referring to FIG. 18, the memory area of the information processor includes a main memory MM kept by the main processor of the multiprocessor, and subprocessor memories SM and HD (magnetic disk storage device) kept by subprocessors. Main memory MM includes memory regions M1–M4. Subprocessor memory SM has a relatively large storage capacity of 6 MB, for example, and includes memory regions M5–M7. Magnetic disk storage device HD has a storage capacity significantly greater than that of main memory MM and subprocessor memory SM for storing first-fourth nth and mth main programs n, and a subprocessor program. The access speed becomes higher in the order of HD, subprocessor memory SM, and then main memory MM. As shown in Table 1, the access speed of HD is significantly slower than memory MM and SM formed of a SRAM or a DRAM.

FIG. 18 shows the program storage status of a certain period during program execution in an information processor. During this time period in main memory MM, area M1, area M3, and area M4 store main program 3, main program 2, and main program 1, respectively. Here, area M2 is empty. A subprocessor program is stored in area M7 in subprocessor memory SM. Here, the memory areas excluding memory area M7 of memory SM have programs stored therein that have low possibility of being executed. These unused areas are called "unused extent" UE. Reservation of a new area for program execution is requested to main memory MM during execution of a program. Such a requested area on a memory is called a requested memory area RE.

The memory area utilization method of FIG. 18 will be described hereinafter with reference to FIGS. 18 and 19.

FIG. 19 shows five different states 1–5 repeating the utilization of the memory area. Those statuses are classified depending on the usage statuses in main memory MM and in subprocessor memory SM, and the roll out statuses for a program requiring area RE and a program unneeded at that time.

In the first status in FIG. 19, there is sufficient available (unused) storage area in main memory MM. When any of the first to third main programs 1–3 in memory MM requires a requested memory an area RE, area RE can be reserved in an empty area in memory MM. A roll out operation is not performed.

In the second status in FIG. 19, there is no available storage area in main memory MM (FULL) i.e., the memory, but there is sufficient available storage area in subprocessor memory SM. If either the first or third main program in memory MM requires area RE, a roll out operation LO1 indicated in FIG. 18 is carried out. The second main program, not required at this point in time is transferred to an empty area in subprocessor memory SM. As a result, the requested memory area RE becomes available in memory MM.

In the third status in FIG. 19, main memory MM and subprocessor SM are both FULL (i.e., neither MM nor SM has sufficient available storage space). If the first or third main program 1 or 3 of memory MM requires a requested memory area RE, the current unused second main program 2, for example, is transferred to the HD (roll out LO3 in FIG. 19 ), to make available the area RE is reserved on memory MM.

In the fourth status of FIG. 19, main memory MM and subprocessor memory SM are both FULL. When either the first or third main program of main memory MM requires reservation of area RE, a program in the unused extent (area) by UE of subprocessor memory SM is transferred to a HD by roll out LO2 shown in FIG. 19. Then, the currently unneeded second main program in main memory MM is transferred to the unused extent UE on subprocessor memory SM. Thus, requested memory area RE becomes available in main memory MM.

In the fifth status of FIG. 19, main memory MM and subprocessor SM are both FULL. If the subprocessor program requests allocation of requested memory area RE, the program stored in unused extent area UE in subprocessor memory SM is transferred to the HD by roll out LO2 as depicted in FIG. 19. Thus, the requested memory area RE is made available the SM.

According to the above-described method, if an unneeded program is to be rolled out from main memory MM, it is first determined whether or not there is unused extent area UE in subprocessor memory SM which can store the programs to be rolled out. If there is such an unused extent area UE available in the subprocessor memory SM, the unneeded programs in main memory MM are rolled out to the unused extent area UE. In this case, the programs are not rolled out to the HD. However, if there is no unused extent area UE available in subprogram memory SM, the program is rolled out to the HD.

In FIG. 18, subprocessor memory SM is first directed to as the storage area for rolling out a program on main memory MM for the purpose of reserving/allocating a requested memory area RE. However, the common memory of the main processor or the subprocessor or another high speed access file such as an IC card or a RAM disk device may be used instead of subprocessor memory SM. Furthermore, although a program is rolled out in the above description, data may be likewise rolled out.

In the conventional case, program and data are rolled out to secondary storage device such as a HD device. In contrast, in the present embodiment it is first determined to store the rolled out program and/or data. If not, that information is rolled out to the whether high speed subprocessor memory SM is available the low speed access HD. Further, the data transfer time period including the operation of roll in (LI1–LI3) carried out corresponding to the above-described roll out (LO1–LO3), respectively, is reduced drastically.

Figure 20:
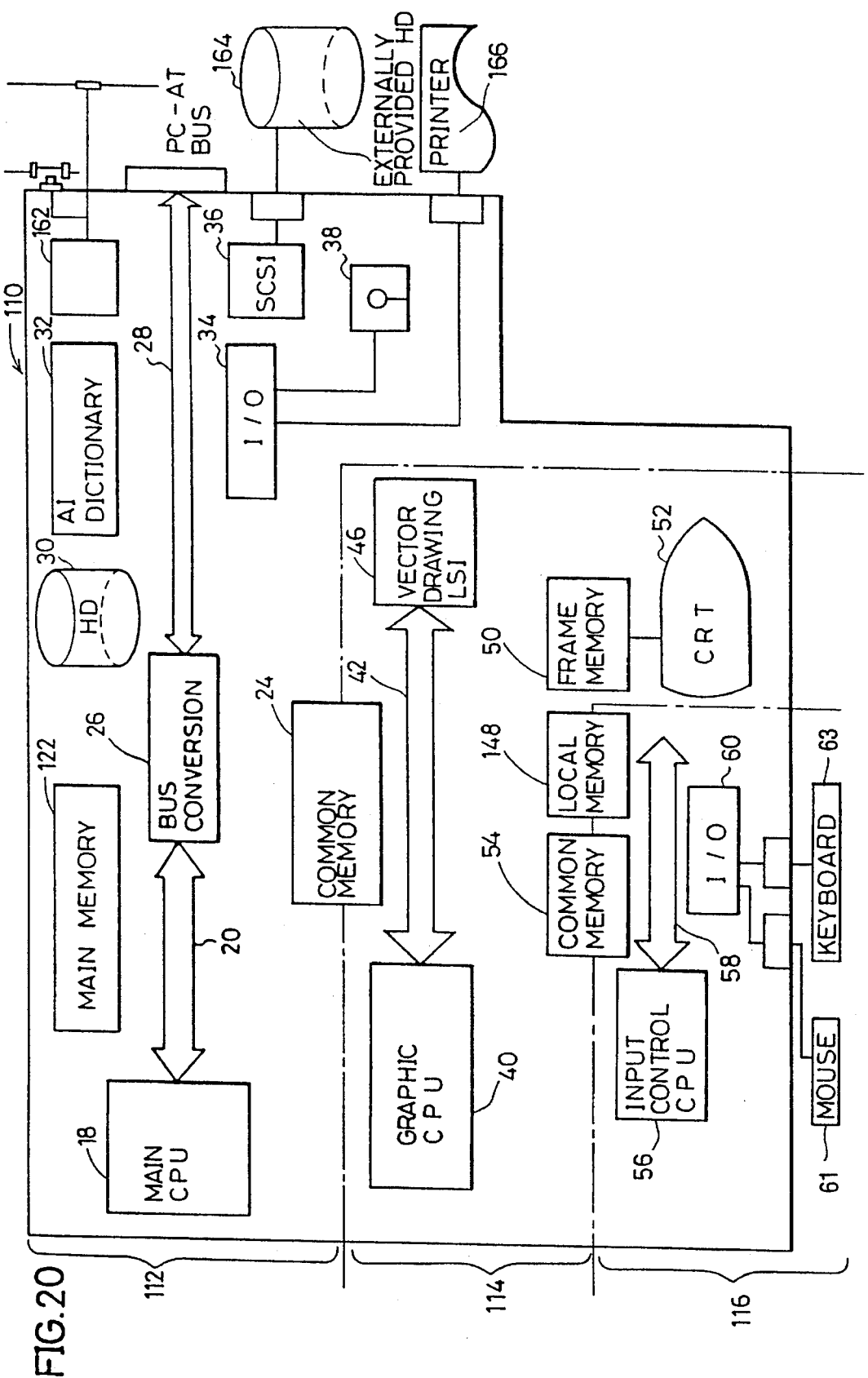
FIG. 20 is a block diagram of a document processing dedicated work station according to the second and third embodiments of the present invention.

FIG. 20 is a block diagram of a document processing dedicated work station 110 according to an embodiment of the present invention.

Figure 21A:
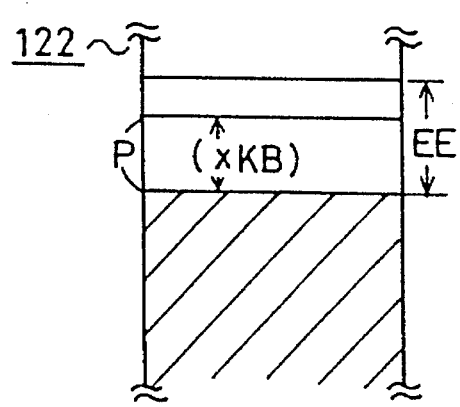
FIGS. 21 (a)–(c) are diagrams for describing the memory area utilization status in the document processing dedicated work station of FIG. 20 according to the control method of FIG. 18 during operation.
Figure 21B:
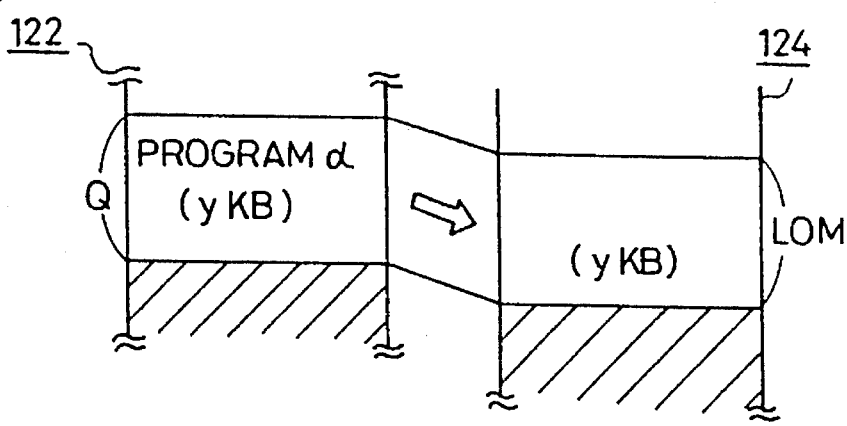
Figure 21C:
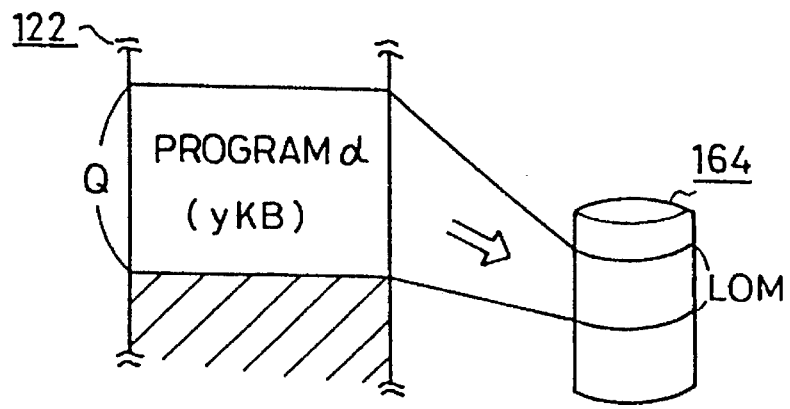

FIGS. 21(a)–(c) are diagrams for describing the memory area utilization status in a work station according to the control method of FIG. 18 at the time of operating the document processing dedicated work station 110 of FIG. 20.

The work station of FIG. 20 is similar to the work station 10 shown in FIG. 20, and employs a hierarchical type multiprocessor structure including a main module 112, a graphic module 114, and an input control module 116 to improve response and operability for the user.

The work station 110 of FIG. 20 differs from work station 10 of FIG. 9 in that work station 110 includes main module 112, graphic module 114, and input control module 116 instead of main module 12, graphic module 14, and input control module 16 shown in FIG. 9.

Main module 112 similar to main module 12 of FIG. 9 includes a main memory 122 instead of local memory 22 of FIG. 9, and a LAN (Local Area Network) control circuit 162. The other elements in main module 112 are similar to those of main module 12 of FIG. 9. Main memory 122 is the same as 22 shown in the local memory of FIG. 9. However, for purposes of this description, that memory is referred to here as local memory 22.

The graphic module 114 of FIG. 20 is similar to the graphic module 14 of FIG. 9, provided that CGROM 44 of FIG. 9 is not included, and a local memory 148 located at the boundary of input control module 116 is included instead of local memory 48 of FIG. 9.

Input control module 116 is similar to input control module 16 provided that local memory 148 is shared with graphic module 114 as mentioned above.

FIGS. 9 and 20 have the same reference characters and names provided for the same components, and their functions are similar. Therefore, their detailed description will not be repeated. An HD 30 and an externally provided HD 122 are provided as a virtual storage device for a great virtual capacity.

Modules 112, 114, 116 each include a unique system software (including the operating system). The system software of module 112.includes a main memory management program (referred to as "main memory management" hereinafter) for controlling and managing the usage of main memory 122. The system software of module 114 includes a graphic memory management program (referred to as "graphic memory management" hereinafter) for controlling and managing the usage of the memory in the relevant module.

The work station has input control module 116, graphic module 114 and main module 112 stacked in a hierarchical manner in order from the module nearest to the input side. An architecture is realized to carry out information exchange between each module by providing a common memory 24 between main module 112 and graphic module 114, and a common memory 54 between graphic module 114 and input control module 116. Memories 122, 24, 50, 54, and 148 are high speed accessible semiconductor memories. By distribution of processes employing such a hierarchical structure and multiplexing of buses, various processes can be addressed ranging from large capacity data process such as image process to process where high response is required such as mouse control.

In work station 110 of FIG. 20, a graphic module Y cooping with image data prepares a large memory space in common memory 24 of FIG. 20 as a data buffer for printing (referred to as "printer buffer" hereinafter). The printer buffer is provided relating to printer 166. Because this printer buffer is required only at the time of a printing operation of printer 166, it is normally an unused extent UE. In rolling out a program from main memory 122, main module 112 first points to unused extent UE of common memory 24 as the area to roll out the program, and then to HD 30 or an externally provided HD 164 which is a secondary storage devices.

The printer buffer of common memory 24 is often an unused extent at the time the system of work station 110 of FIG. 20 is just turned on. Therefore, common memory 24 is first directed to as roll out destination of a program of main memory 122 right after the system is turned on. The printer buffer may have print data stored therein during operation of the work station. In this case, the printer buffer is not an unused extent UE, so that HD 30 or external HD 164 which is secondary storage device is directed to as the roll out destination of the program from main memory 122.

For the sake of simplification, it is assumed that unused extent UE of common memory 24 and then externally provided HD 164 is advanced as the area to roll out the program in main memory 122.

FIG. 21 (a)–(c) show the status of memory area usage in operating the document processing dedicated work station 110 of FIG. 20 according to the control method of FIG. 18.

FIG. 21 (a) shows the case where an empty extent EE (>xKB) exists in main memory 122 when an allocation of a partition of xKB (memory area) is required in main memory 122 by module 112 at the time of operation of the work station. A partition xKB is allocated in main memory 122, and a partition number of P is given to that partition.

FIG. 21 (b) shows the case where module 112 rolls out a program α of yKB which is the size of partition Q stored in main memory 122 into the unused extent common memory 124. Here, an empty area of yKB is newly reserved in main memory 122. Common memory 124 includes a roll out area LOM of yKB as a result of program α rolled out in main memory 122.

FIG. 21 (c) shows the case where module 112 rolls out program α of yKB in main memory 122 into HD 164. Here, an empty area of yKB is newly reserved in main memory 122, and HD 164 includes a roll out area LOM of yKB where the rolled out program α is stored.

Figure 22:
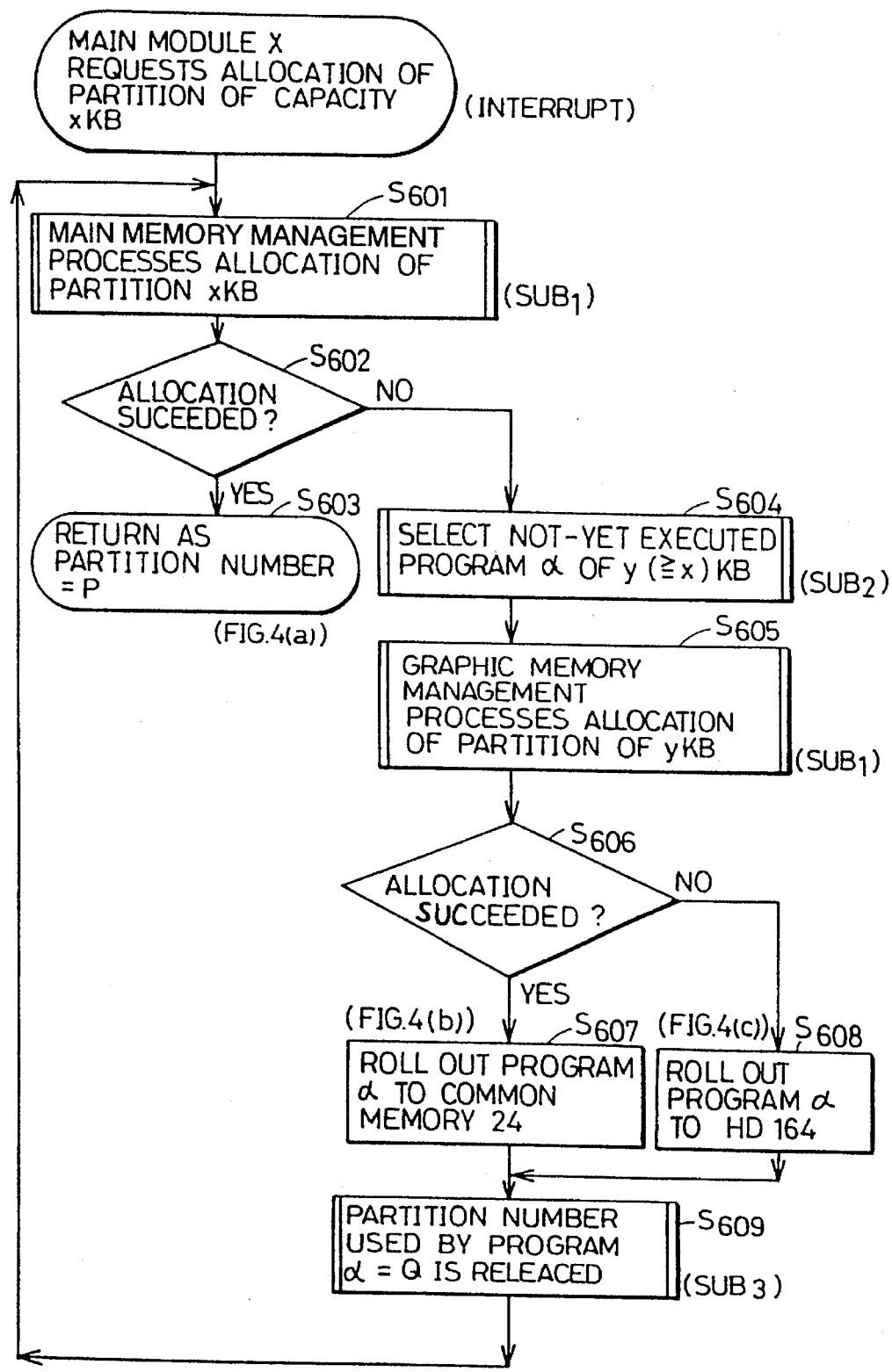
FIG. 22 is a flow chart showing the sequence of memory area utilization according to the control method of FIG. 18 at the time of operating the document processing dedicated work station of FIG. 20.

FIG. 22 is a flow chart showing the sequence of memory area utilization according to the control method of FIG. 18 at the time of operation of the document processing dedicated work station 110 of FIG. 20.

FIGS. 23 (a) and (b) show an example of a table structure referred to during the execution of the flow of FIG. 22.

FIGS. 23 (a) and FIG. 23 (b) show an example of a structure of a memory management table MTB and an empty area table ETB, respectively.

Memory management table MTB of FIG. 23 (a) and empty area table ETB are respectively provided corresponding to each memory.

Referring to FIG. 23 (a), table MTB includes a partition number f for each partition provided in the memory, capacity cp, head address hb, and area status st. Partition number f is provided for identifying uniquely a partition on a memory, and is continuous in ascending order as shown in FIG. 23 (a). Capacity cp indicates the size of the partition, and head address indicates the head address of the partition in the memory. Area status st indicates whether a program or data is stored in that partition. If not stored, "empty" is set, otherwise, "allocated" is set.

Empty area table ETB of FIG. 23 (b) is provided in relation to memory management table MTB to exclusively manage the partitions in the memory managed by memory management table MTB which have the area status st="empty". For each partition registered in memory management table MTB having an area status of st="empty", a reference flag F, partition number DN, capacity CP, head address HB, and area status ST are provided. Reference flag F is set to "1" when the program or data stored in that partition is referred to (is accessed). Partition number DN identifies uniquely a partition and matches that in memory management table MTB. Capacity CP indicates the size of that partition, and head address HB indicates the head address of that partition in the memory. Area status ST is similar to area status st in memory management table MTB, and indicates whether that partition is "empty" or "allocated". In this case, "empty" is set for area status ST to indicate that the relevant partition is empty.

Because the main memory management of work station 110 of FIG. 20 accesses memory management table MTB and empty area table ETB provided corresponding to main memory 122, the data stored therein is read/written by the main memory management. Similarly, the data stored in memory management table MTB and empty area table ETB provided corresponding to each memory in graphic module 114 is read/written by the graphic module management. Tables MTB and ETB provided corresponding to each memory have data updated according to the utilization status of the memory at the time of operation of the work station.

The procedure of FIG. 22 will be described hereinafter with reference to FIGS. 20–23.

When the power of work station 110 of FIG. 20 is turned on, work station 110 initiates the data process. It is assumed that main module 112 request reservation of a temporary buffer of capacity xKB in main memory 122, for example. In response to the allocation request of this partition, a series of process for the allocation request of a partition of xKB of FIG. 22 is initiated.

When main module 112 request allocation of a partition of capacity xKB, this is acknowledged as an interruption, and the process proceeds to subroutine SUB1 of step S601 (abbreviated as S601 hereinafter). Subroutine SUB1 described further below the process of allocating a partition of xKB on main memory 122. When the allocation process of a partition by subroutine SUB1 is finished, the process returns to module 112. At S602, determination is made whether allocation of a partition in memory 122 has succeeded or not. If determination is made that allocation of a partition has succeeded as shown in FIG. 21 (a), the process proceeds to S603 where the partition program (=P) allocated by the main memory is transmitted to the program having its process suppressed by an immediate preceding interruption to restart execution of that program.

If allocation of a partition of capacity xKB could not be carried out on main memory 122 in the process of S602, the control proceeds to subroutine SUB2 of S604.

Although the details of the process of subroutine SUB2 will be described afterwards, here the main memory management selects a program α of y ($\geq$x) KB not executed on main memory 122 to reserve a temporary buffer of capacity xKB on main memory 122. The selected program α is the program to be rolled out from main memory 122. When the roll out program α is selected, the process of subroutine SUB2 is finished, and the process proceeds to S605.

At S605, the process of the aforementioned subroutine SUB1 is initiated. Subroutine SUB1 of S605 is executed by the graphic memory management. The graphic memory management carries out a process to allocate a partition yKB where the program α selected at S604 is to be rolled out on common memory 24. After this allocation process, the process returns to module 112 to proceed to S606.

At S606, determination is made whether allocation of a partition yKB on common memory 24 by the graphic memory management in S605 has succeeded or not. If determination is made of success of allocation, the process proceeds to S607.

At S607, program α on main memory 122 is rolled out to common memory 24 in response to the allocation of a new partition of yKB by the graphic memory management on common memory 24. This manner is illustrated in FIG. 21 (b). In FIG. 21 (b), program α to be rolled out in main memory 122 is rolled out to a roll out area LOM allocated on common memory 24 by the graphic memory management. As a result, an empty area is generated of partition number Q on main memory 122. Then, the process proceeds to S609 which will be described afterwards.

Returning to the process of S606, if allocation of a new partition of capacity yKB on common memory 24 could not be carried out by the graphic memory management at S605, the process of S608 is executed.

At S608, program α on main memory 122 is rolled out to HD 164, as shown in FIG. 21 (c). Program α on main memory 122 is rolled out to a roll out area LOM on HD 164. As a result, an empty area of capacity yKB is generated in main memory 122. Then, the process proceeds to S609.

The above-described process of S608 is not required and will not be carried out when program α is already stored in HD 164.

At S609, a release process is carried out so that the partition (partition number=Q) used by program α on main memory 122 by the main memory management becomes empty. Although the details of this procedure will be described later, the release of a partition of partition number=Q on main memory 122 will cause the process to return to S601 to be ready for the next interruption which occurs by main module 112 requesting for allocation of a new partition.

Thus, when main module 112 request allocation of a partition, subroutine SUB1 of S601 carries out allocation of a partition on main memory 122. If allocation of a partition could not be carried out on main memory 122, the processes of S604–S609 are executed, whereby an attempt to roll out program α on main memory 122 to common memory 24 is made. If program α on main memory 122 cannot be rolled out to common memory 124, the roll out destination is changed to HD 164. Thus, when a new partition allocation request on main memory 122 is generated, the program to be rolled out from main memory 122 is first directed to common memory 24, and then to HD 164 when roll out to common memory 24 is not possible.

Figure 24:
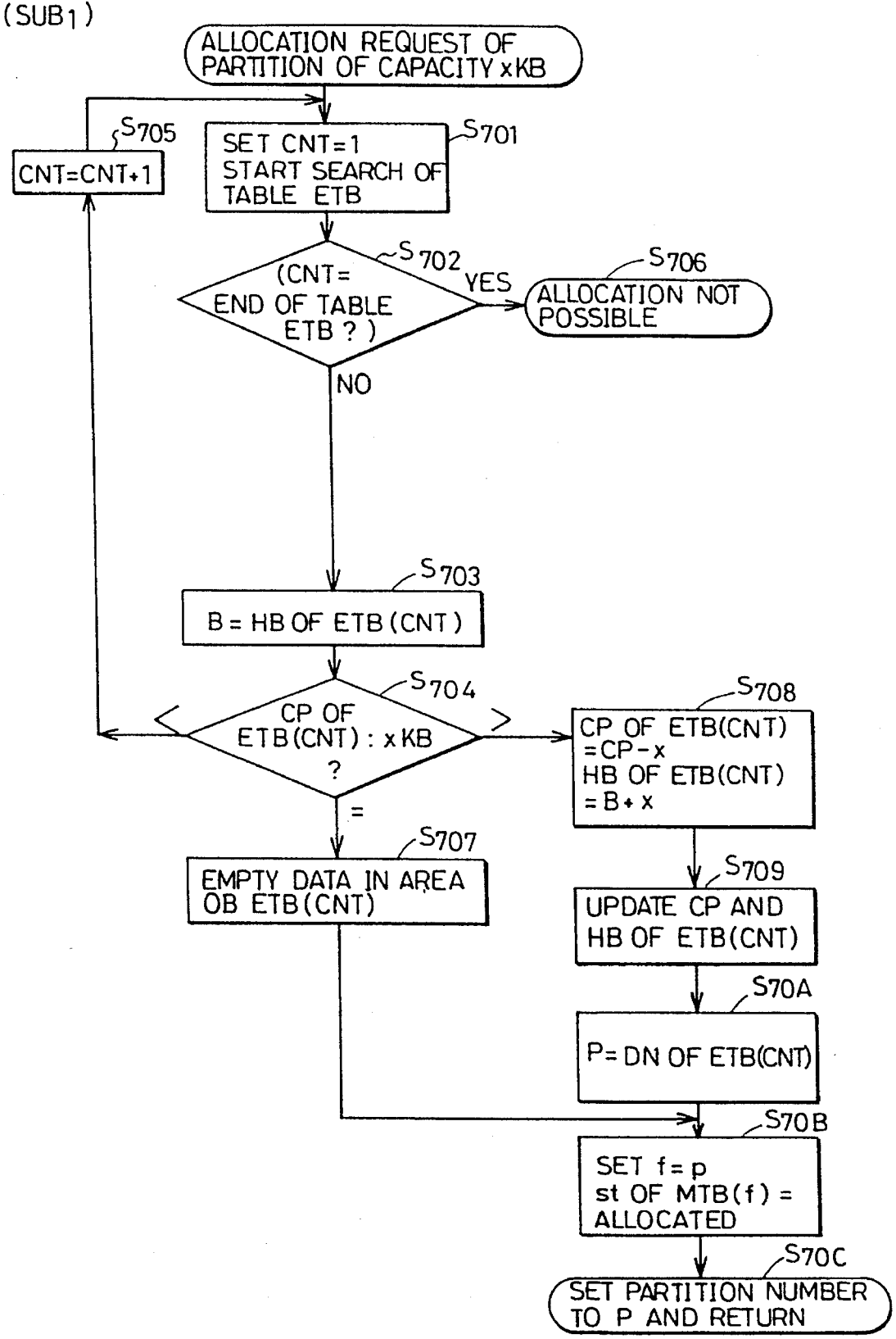
FIG. 24 is a procedure flow chart of subroutine SUB1 shown in FIG. 22.
Figure 25:
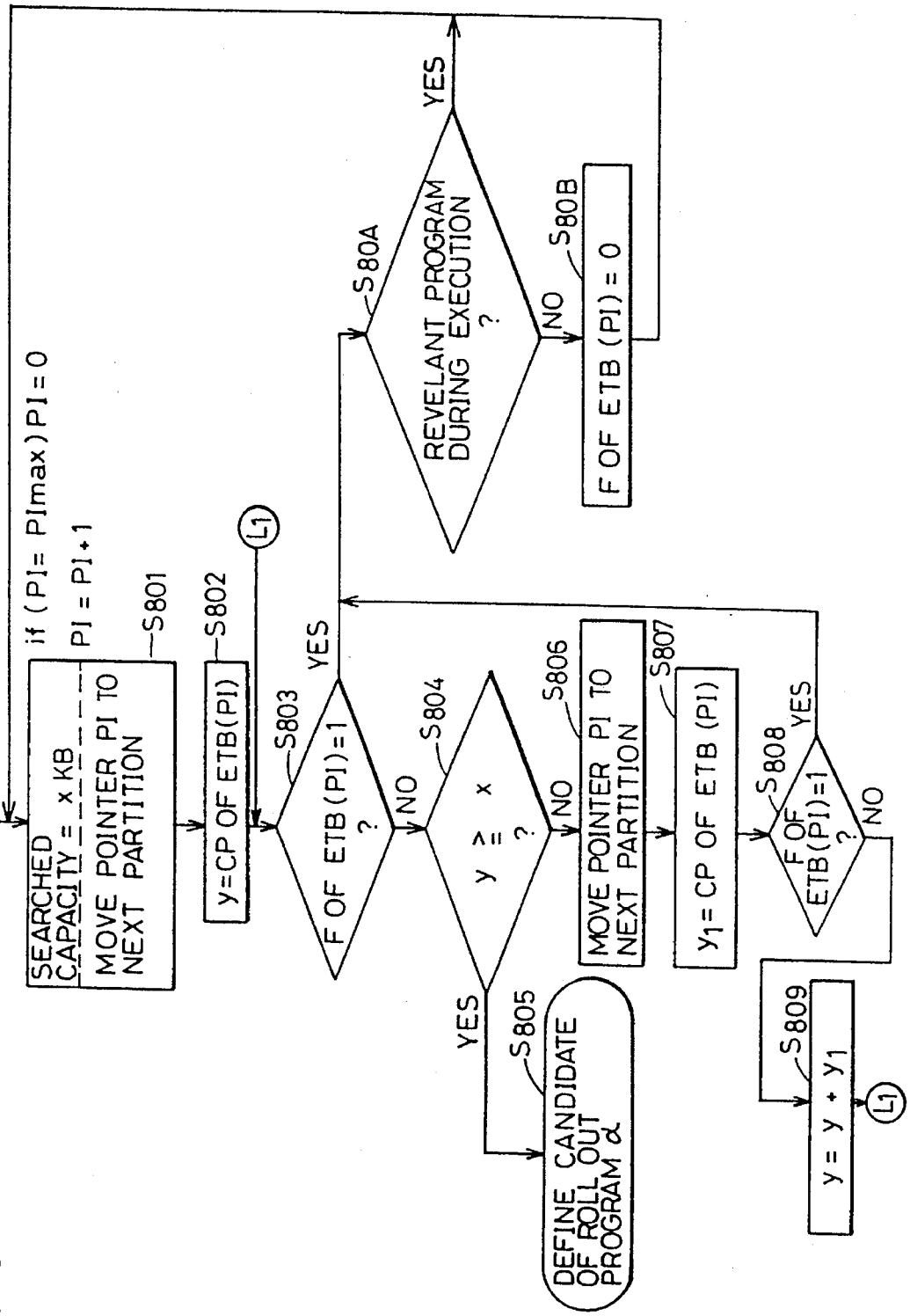
FIG. 25 is a procedure flow chart of subroutine SUB2 shown in FIG. 22.

FIGS. 24 and 25 are flow charts of subroutine SUB1 and subroutine SUB2 of FIG. 22, respectively.

Figure 26:
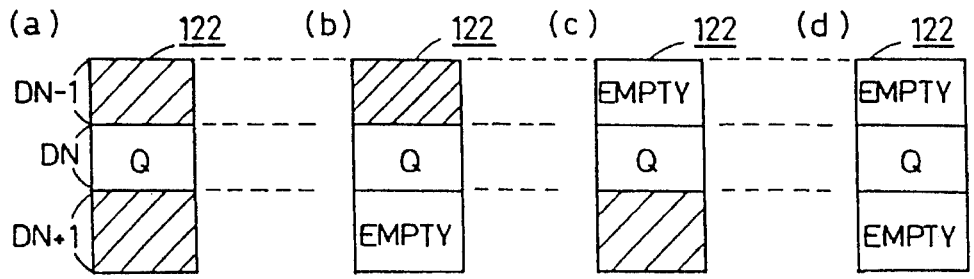
FIG. 26 shows examples of the main memory utilization status obtained in accordance with the procedure of FIG. 22.

FIGS. 26 (a)–(d) indicate the main memory utilization status obtained according to the procedure of FIG. 22.

Figure 27:
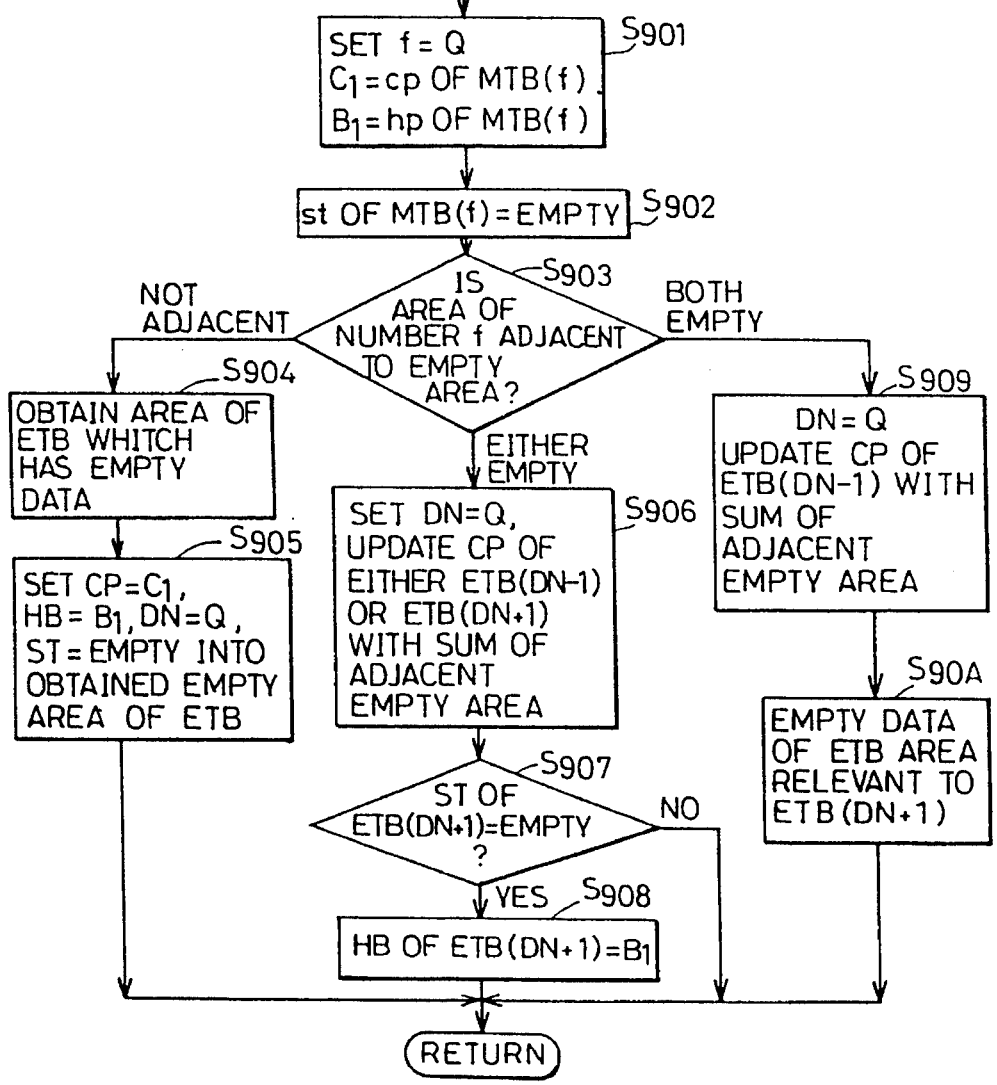
FIG. 27 is a procedure flow chart of subroutine SUB3 shown in FIG. 22.

FIG. 27 is a flow chart of subroutine of SUB3 shown in FIG. 22.

The memory area utilization procedure of FIG. 22 will be described including each subroutine process with reference to FIGS. 24–27.

Referring to FIG. 22 where main module 112 requests allocation of a partition of capacity xKB, this is addressed as an interruption where the process of S601 (subroutine SUB1 of FIG. 24) is executed.

Subroutine SUB1 of FIG. 24 receives an allocation request of a partition of capacity xKB to be executed by the control of the main memory management.

When allocation of a new partition of capacity xKB on main memory 122 is requested from main module 112, the main memory management starts the execution of subroutine SUB1. While repeating the loop process including S701–S705, empty area table ETB relating to main memory 122 is searched from the beginning to identify a partition having a capacity CP greater than xKB. If table ETB is searched from the beginning to the end by repeating the loop process and no partition having a capacity CP greater than xKB could be found, a new allocation of a partition of a capacity xKB has failed main memory 122. In this case, the control emits from the loop process to carry out the process of S706. The process of subroutine SUB1 is terminated and data indicating that allocation is not possible is passed to main module 112.

When a partition having a capacity greater than xKB is identified during the search from the beginning of empty area table ETB, the control immediately emits this loop process to execute the process of S707 to S70C.

During the process of S707 to S70C, empty area table ETB of main memory 122 is searched. In response to determination of the presence of a partition having a capacity CP greater than xKB, data is updated in tables ETB and MTB for the identified partition on main memory 122. When the identified partition has a capacity CP equal to xKB, all the data in table ETB regarding the partition identified by the process of S707 is made blank (data with no meaning). Because the data in table ETB is updated using xKB regarding the partition identified in the process of S708 to S70A when capacity CP is greater than xKB, the capacity CP of the relevant partition is (CP–x) KB, and the head address HB is (HB+x).

After data update of empty area table ETB regarding the identified partition, the partition number DN of the identified partition is set to partition number P. Also, because a new partition of capacity xKB is allocated in main memory 122, the area status st in table MTB regarding partition number P is set to "allocated".

Thus, data is updated in empty area table ETB and memory management table MTB so as to carry out a new partition allocation of capacity xKB on main memory 122. The partition number P newly allocated on main memory 122 is passed to main module 112, and the process of subroutine SUB1 is finished.

The process returns to S602 of FIG. 22. If partition number P is the data passed from subroutine SUB1, control proceeds to S603 since allocation of a partition of capacity xKB on main memory 122 has succeeded. Then, the process returns to main module 112. Here, the newly partition allocation status on main memory 122 is as illustrated in FIG. 21 (a).

When data indicating that allocation is not possible is passed from subroutine SUB1, determination is made that the allocation of a partition of a capacity xKB on main memory 122 could not be carried out at the process of S602, and the process of subroutine SUB2 of S604 is executed.

FIG. 24 shows the process of subroutine SUB2. This process is executed by the control of the main memory management.

Subroutine SUB2 of FIG. 25 is carried out when there is not enough empty area for allocating a partition of capacity xKB on main memory 122 in the above-described subroutine SUB1. An unneeded program is selected from the programs stored in memory 122 to be rolled out, whereby an empty area is newly created for the allocation of the partition of capacity xKB on memory 122.

By searching empty area table ETB relating to main memory 122 from the beginning, determination is made whether reference flag F is "1" (S803). F=1 means that the program stored in the relevant partition is recently referred to (accessed) and is removed from the program candidate to be rolled out. Then, determination is made whether that program is during execution or not (S80A). If determination is made that the program is during execution, the next partition in empty area table ETB is searched. If determination is made that program is not currently being executed, reference flag F is reset to F=0 (S80B), and the next partition in empty area table ETB is searched.

The control returns to the process of S803 where determination is made that the program is a candidate for being rolled out if reference flag is F=0. At S804, determination is made whether the capacity cp of that partition is equal to or greater than capacity x. Satisfaction of the above requirement means that partition allocation of capacity x is possible in the relevant partition, whereby the program stored therein is selected as program α to be rolled out (S805), and the process of subroutine SUB2 is terminated.

If capacity cp of the relevant partition is smaller than capacity x according to the determination of S804, the next area in empty area table ETB is searched, and determination is made whether reference flag F=1. If F=1, S80A et seq. are executed. If F=0, the capacity of that partition is added to the capacity for allocating capacity x (S809). Then, the control returns to the process of S803.

Thus, in subroutine SUB2, an area (capacity yKB) continuously allocated with a partition storing a program not recently referred to and executed of the programs stored in main memory 122 is identified, whereby the program stored therein is defined as program α to be rolled out. When program α to be rolled out from main memory 122 is defined in subroutine SUB2, the control proceeds to the process of subroutine SUB1 of S605 in FIG. 22. The control proceeds to the graphic memory management.

The graphic memory management executes subroutine SUB1 of FIG. 24 similarly as described before and tries to allocate a partition of capacity yKB on common memory 24 of a size that can store program α rolled out from main memory 122. If a partition of capacity yKB can be allocated on common memory 24 by subroutine SUB1, the partition number is passed to main module 112, otherwise data indicating that allocation is not possible is passed to main module 112.

The result of allocation of a partition of capacity yKB on common memory 24 in S605 is determined at S606. If a partition number is passed, the control proceeds to S607, otherwise to S608.

At S607, program α on main memory 122 is rolled out into a roll out area LOM as shown in FIG. 21 (b) in response to the success of allocation of a partition of capacity yKB on common memory 24. This roll out area LOM is a partition allocated with the size of capacity yKB on common memory 24 by the graphic memory management at S605. At S608, program α on main memory 122 is rolled out to HD 164 as shown in FIG. 21 (c) since a roll out area LOM could not be allocated in common memory 24.

After roll out of program α on main memory 122, the process of S609 is executed.

At S609, the main memory management carries out the release of the partition where program α rolled out to common memory 24 on main memory 122 or HD 164 was previously stored. More specifically, request of release of partition number Q on main memory 122 shown in FIGS. 21 (b) or 21 (c) is requested to the main memory management. In response to this release request, the main memory management executes the process of subroutine of SUB3 shown in S609.

The main memory management responds to the release request of partition number Q to initiate the execution of subroutine of SUB3 shown in FIG. 27.

The partition of partition number Q storing program α exists under any of the status of FIGS. 26 (a)–(d) on memory 122.

FIG. 26 (a) shows the status where the partition adjacent to the partition of number Q on memory 122 is not empty. FIGS. 26 (b) and (c) show the status where either of the partitions adjacent to the partition of number Q is empty. FIG. 26 (d) shows the status where both partitions adjacent to the partition of number Q are empty.

The main memory management executes subroutine SUB3 of FIG. 27 to determine which status of FIGS. 26 (a)–(d) the partition of number Q is allocated on main memory 122. According to the determination result, when partitions including the partition of number Q on main memory 122 are adjacent to each other on main memory 122, data in main management table MTB and empty area table ETB are updated so that the adjacent partitions become one continuous empty partition.

First, the main memory management searches table MTB relating to main memory 122 to "read out" the capacity CP and head address HB of the partition corresponding to partition number Q, whereby variable C1=capacity cp and variable B1=head address hp are set, followed by setting status st of the area of table MTB to "empty" (S901 and S902).

Then, determination is made to which status of FIGS. 26 (a)–(d) the partition of number Q is allocated on memory 122 (S903).

If determination is made that the allocation is of status of FIG. 26 (a), the series of data regarding partition of number Q are newly written into empty area table ETB. More specifically, the information of partition number Q of FIG. 26 (a) is added to empty area table ETB where capacity CP=C1, head address HB=B1, partition number DN=Q, and area status ST= "empty" are set (S904 and S905).

If determination is made that the allocation is of the status of FIG. 26 (b) or (c), the data relating to one adjacent empty partition are updated in empty area table ETB to combine the one adjacent empty partition with partition Q (S906–S908).

If determination is made of the allocation of status of FIG. 26 (d), the data in empty area table ETB are updated so that the area of the three empty partitions including the partition of number Q are one continuous empty partition (S909 and S90A).

Thus, according to the status of the partition of number Q taking the status of FIGS. 26 (a)–(d), the data in empty area table ETB is updated to set partition Q to an empty area on main memory 122. Then, the process of subroutine SUB3 is finished to return to main module 112.

Because a program to be rolled out from main memory 122 is selected which is directed to a relatively high speed accessible common memory 24 when main module 112 requires a storage capacity exceeding the capacity of main memory 112, the time required for program roll out is reduced in comparison with the conventional case where HD 164 is specified as the destination for roll out.

In the above embodiment, the description of an operation when graphic module 114 request allocation of a partition of capacity xKB on common memory 24 is omitted. The allocation of this partition is carried out by a procedure routine similar to the above described main module 112.

When a partition of a size identical to the area where program α is rolled out from main module 112 is required by the graphic module 114 side for some data process, a process similar to the above-described FIG. 22 is carried out. It is to be noted that the main program in the upper layer of main module 112 is extracted in priority as the program candidate for roll out in graphic module 114.

Although the above described embodiment has a multi-processor structure, the present invention may be applied to the case where a memory corresponding to common memory 24 is newly provided in a single processor.

The present invention is not limited to the above described embodiment where only common memory 24 is used, and the empty area of a plurality of memories of high speed access in the device of FIG. 20 may be used.

Thus, according to the second embodiment, data is selectively rolled out to either a hard disk or a common memory when data stored in the main memory is to be rolled out. When determination is made that the main memory management could not reserve an area in response to a reservation request of an area of a predetermined capacity in the main memory, the data on the main memory selected by the main memory management is transferred to a hard disk or a common memory, whereby reservation of a memory becomes possible in the main memory. Thus, the data rolled out from the main memory, or the data selected by the main memory management according to a reservation request of an area of a predetermined capacity in the main memory is rolled out or transferred to either a hard disk or a common memory. Because the common memory is accessible at a speed faster than hard disk, the time required for roll out or data transfer can be reduced in comparison with the conventional case where the roll out or transfer destination are all directed to the hard disk.

This improvement in speed can be realized not only in an information processor further including a high speed accessible memory such as a common memory, but also in an information processor including a main memory, a hard disk, and a high speed accessible memory besides the main memory by effectively utilizing presently provided storage means. The present embodiment provides the effect of improving the cost performance of an information processor.

Third Embodiment

A third embodiment of the present invention will be described in details with reference to the drawings.

Figure 28:
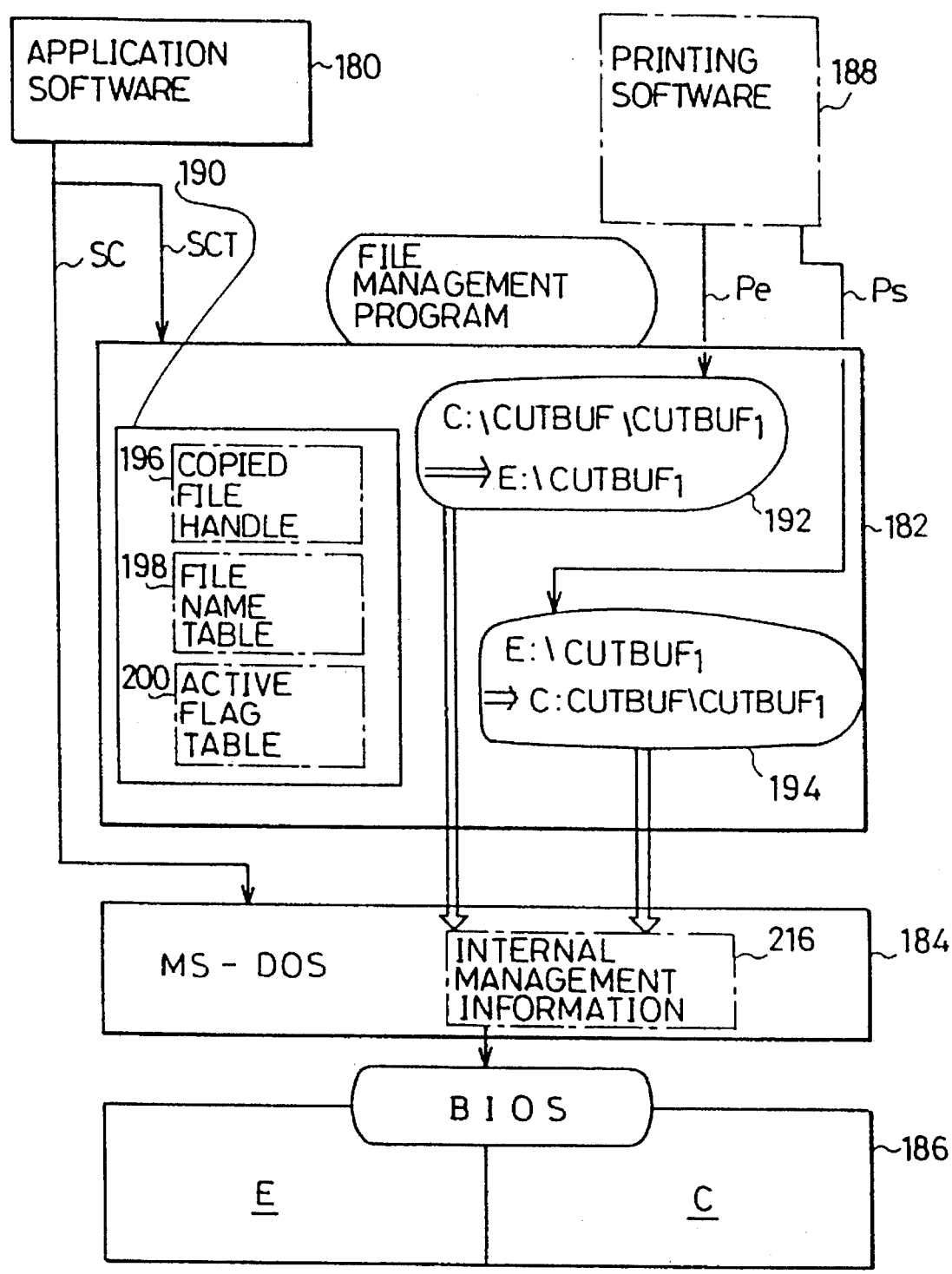
FIG. 28 is a system structure diagram in an information processor according to a third embodiment of the present invention.

FIG. 28 is a system structure of an information processor according to a third embodiment of the present invention.

The document processing dedicated work station having the information processor mounted according to the third embodiment has a block structure identical to that shown in FIG. 20. Therefore, detailed description thereof will not be repeated.

Although main memory 122 of FIG. 20 is the main memory in the present system, it can be considered as the local memory of main module 112 if the system is divided into modules 112, 1114, and 116. In the following, main memory 122 is termed the local memory.

In the third embodiment, a disk cache is realized of high cost efficiency for allowing high speed access of an HD 30 or an HD 164.

In document processing dedicated work station 110 of FIG. 20, graphic module 114 prepares in advance a vast memory space of more than 4MB as the printer buffer. This printer buffer is allocated in common memory 24. Because the printer buffer is required only at the time of the printing operation of printer 166, it is normally an unused memory (referred to as unused memory hereinafter). Main module 112 sets the disk cache memory relating to HD 30 or an external HD 164 as the printer buffer when common memory 24 is not used.

At the time of turning on the system of the work station of FIG. 20, the printer buffer allocated in common memory 24 is often an unused memory. Therefore, the printer buffer is specified as a RAM disk cache memory at the time of turning on the system. This printer buffer is specified as the RAM disk cache memory of HD 30 or externally provided HD 164 if necessary during the actuation of the work station. The RAM disk cache memory is termed as RAM disk hereinafter.

In the present embodiment, the following functions are prepared to realize the above-described RAM disk.

1) Function to examine whether there is an unused memory other than local memory 122 in the system or in the network to which the system is connected, or the function to manage information relating to the unused memory.

2) Function to specify the unused memory as a RAM disk (including file copy (load)).

3) Function to access a file in an unused memory

4) Function to release the unused memory from the specification of a RAM disk according to a request from another resource (another module).

The above search of 1) of whether there is an unused memory includes the method of examining at the time required, and the method of positively using a memory area in which the usage manner is limited and comprehended in advance. The present embodiment will be described according to the latter method.

Figure 29:
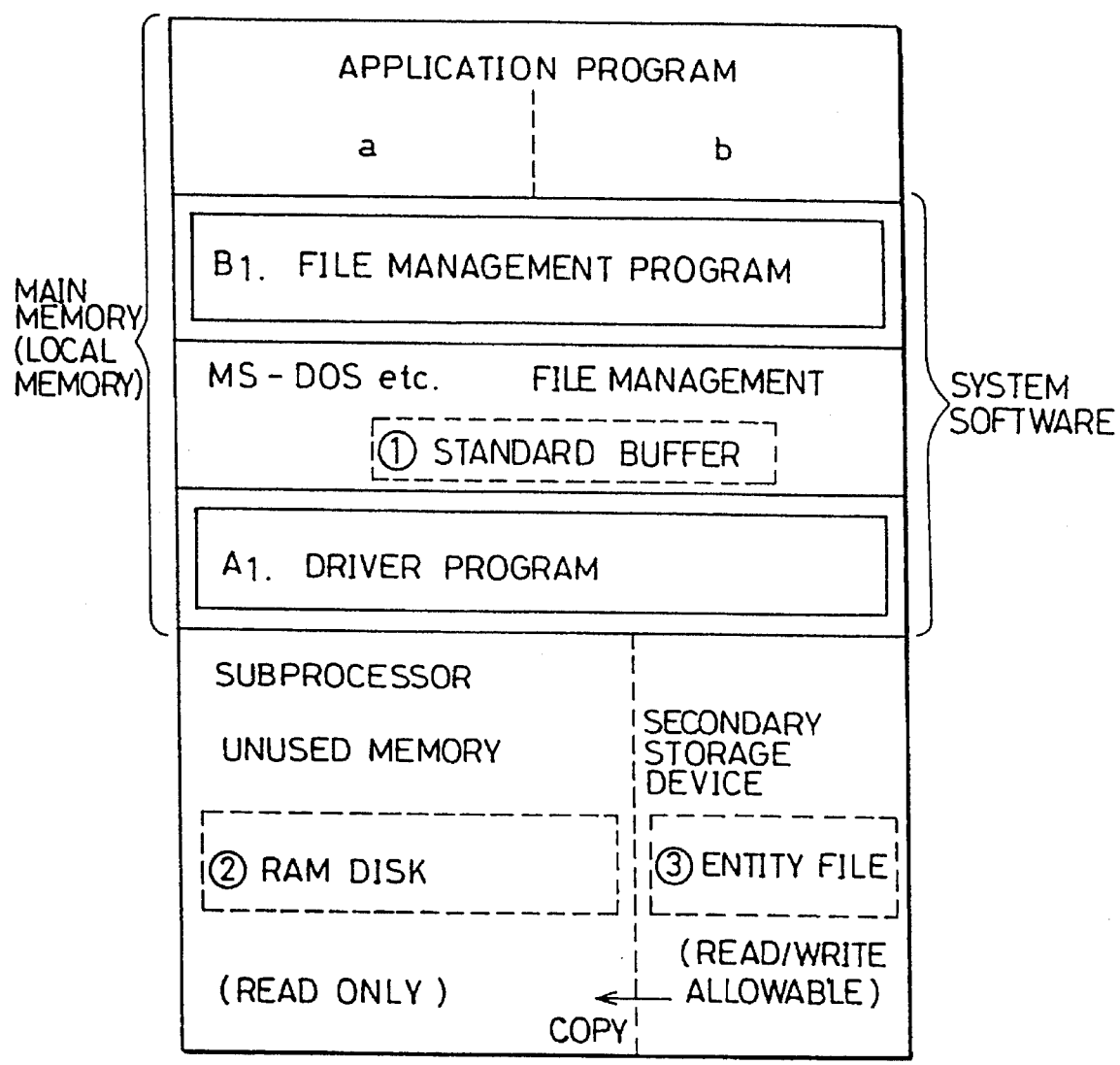
FIG. 29 schematically shows a disk cache in an information processor according to the third embodiment of the present invention.

FIG. 29 shows a structure of a software in local memory 122 of main module 112 in FIG. 20 for realizing a RAM disk using common memory 24.

Referring to FIG. 29, an application program and a system software are allocated in the main memory corresponding to local memory 122. The application program includes application programs a and b. The system software includes a file management program B1, the MS-DOS (a trademark of Microsoft Inc.), a software for file management, a standard buffer (1) of high speed and small capacity, and a drive program A1.

A subprocessor system including graphic module 114 where various softwares allocated in the main memory are the upper level system is shown in FIG. 29. The subprocessor includes a RAM disk (2) which is an unused memory included in common memory 24. A secondary storage device includes an HD 30 and an external HD 164 with the softwares of main memory 122 as the high level system in FIG. 29. The secondary storage device stores an entity file (3) which is a group of data. The secondary storage device is readable/writable, and RAM disk (2) is a read only memory in the present embodiment. Only copy of data from the secondary storage device to common memory 24 is permitted. Entity file (3) stored in the secondary storage device is transferred to RAM disk (2) within common memory 24 by a copy process to be stored.

The drive program A1 in FIG. 29 carries out data management in RAM disk (2) in the unit of physical tracks/sectors. A file management program B1 carries out data management in RAM disk (2) in the unit of logical files. In the present embodiment, data management in the unit of files is carried out according to the method of file management program B1, and RAM disk (2) is constructed according to the method of driver program A1.

Figure 30:
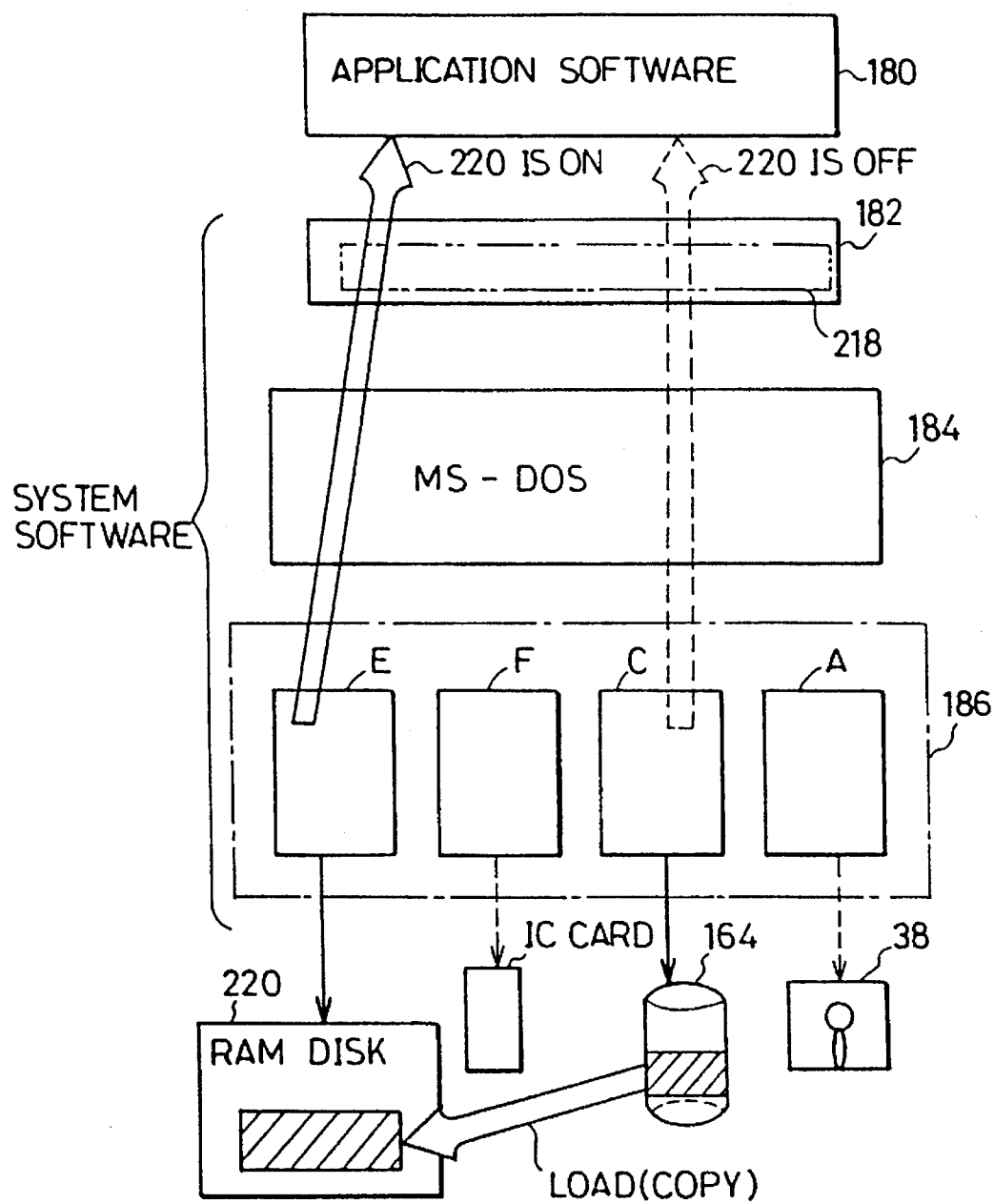
FIG. 30 shows a disk cache method in the work station shown in FIG. 20.

FIG. 30 shows a specific example of a disk cache method in the work station of FIG. 20. It is assumed that only HD 164 is the secondary storage device and a RAM disk is constructed as a disk cache. Referring to FIG. 30, the main memory of FIG. 29 (local memory 122 in FIG. 20) includes an application software 180, a file management program 182, the MS-DOS 184, and a file relating BIOS (Basic I/O system) 186. Application software 180 is equivalent to the application program of FIG. 29. File management program 182, MS-DOS 184, and file relating BIOS 186 are equivalent to the respective programs in the system software of FIG. 29. File management program 182 includes a drive change switch program 218. File relating BIOS 186 includes an FDD (FD Driver) program A, an HDD (HD driver) program C, an IC card driver program F, and a RAM disk driver program E.

Program A controls FD 38 of FIG. 20. Program C controls externally provided HD 164 of FIG. 20. Although not shown in FIG. 20, program F controls IC card and the like. Program E controls a RAM disk 220 provided in common memory 24. Frequently accessed files in HD 164 are loaded (copy) into RAM disk 220 by the control of HDD program C and RAM disk driver program E. Here, programs C and E are equivalent to driver program A1 of FIG. 29 and carries out data loading in the unit of physical tracks/sectors.

When there is a file loaded into RAM disk 220, application software 180 is notified that RAM disk 220 attains a ON status (a status that a file is loaded) via the system software. Conversely, application software 180 is notified that RAM disk 220 attains an OFF status (file not loaded and does not exist) via the system software.

Drive change switch program 218 switches between driver programs in file relating BIOS 186. The details of this program will be described later.

As shown in FIG. 30, each I/O device (referred to as media hereinafter) is provided with an exclusive driver program. Each driver program has its actuation permitted by MS-DOS 184 of a higher level. MS-DOS 184 permits actuation of various media according to the instruction of drive change switch program 218 in file management program 182 of a further higher level. Application software 180 is allowed to use various media via file management program 182, MS-DOS 184, and file relating BIOS 186.

Figure 31:
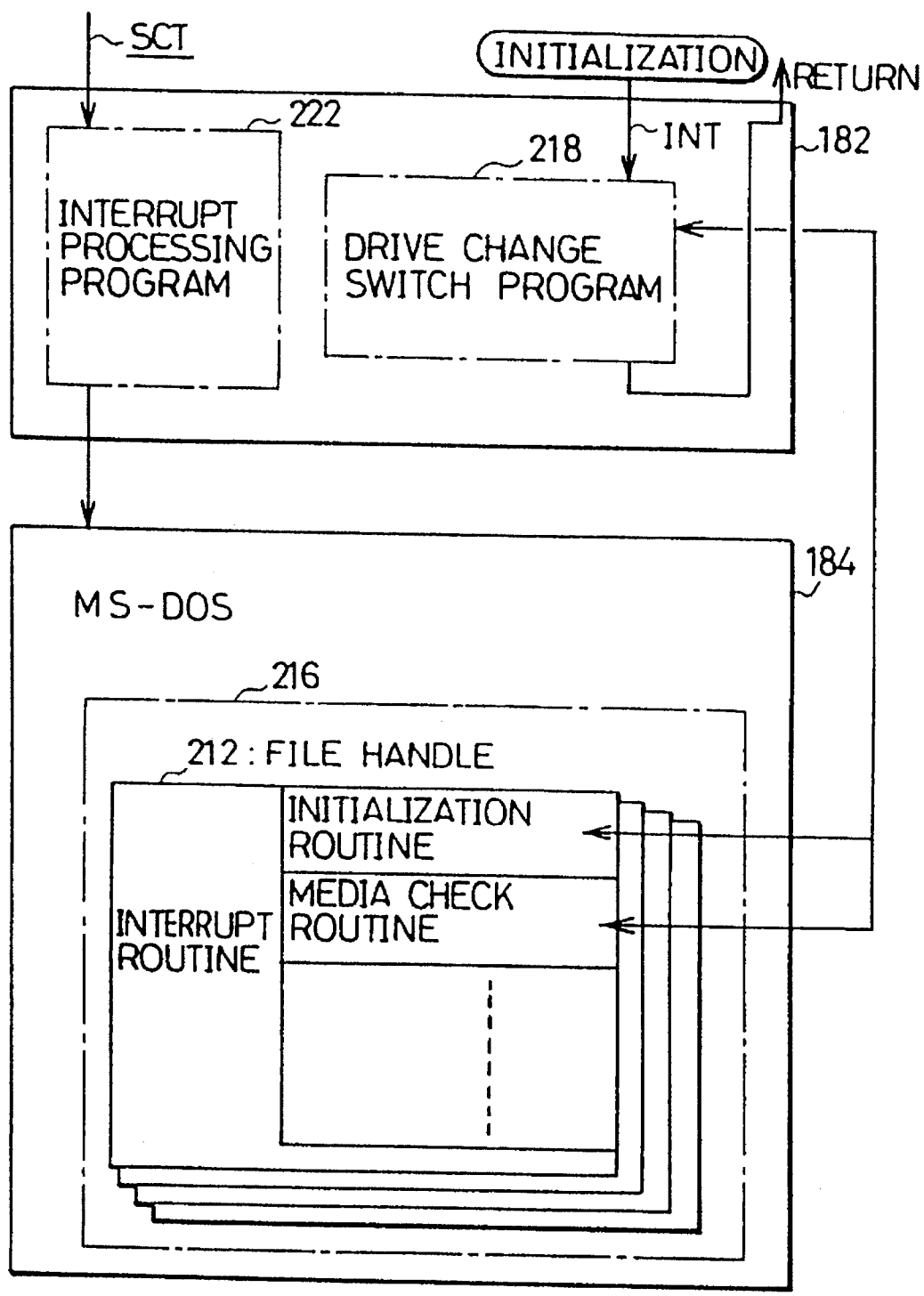
FIG. 31 schematically shows a disk cache method when a printer buffer is used as a disk cache memory in the work station shown in FIG. 20.

FIG. 31 shows the input/output between file management program 182 and MS-DOS 184 of FIG. 30. Referring to FIG. 31, file management program 182 includes an interrupting process program 222, and a drive change switch program 218 mentioned above. MS-DOS 184 includes an internal management information 216. Internal management information 216 includes a plurality of file handles 212. File handle 212 is provided for each of the various media in FIG. 30 and has a common structure. Each file handle 212 includes an initialization routine which is an interrupting routine and a media check routine.

Various file handles 212 are selectively accessed by drive change switch program 218. If drive change switch program 218 selects file handle 212 relating to RAM disk 220 of FIG. 30, for example, program 218 responds to an externally applied initialization request INT to activate the initialization routine of file handle 212. The activated initialization routine initializes the area of RAM disk 220 of FIG. 30. Termination of initialization is notified to drive change switch program 218. The media check routine is activated by drive change switch program 218. The activated media check routine checks whether a file (program or data) is loaded and stored in RAM disk 220 of FIG. 30. The result of this check is supplied to drive change switch program 218. Drive change switch program 218 supplies the check result provided from the media check routine to application software 180 with the return value set to RETURN.

Interrupt process program 222 of file management program 182 responds to an externally applied file access request SCT to notify MS-DOS 184 that there is a file access request SCT by an interrupt process.

As shown in FIG. 31, MS-DOS 184 includes file handles 220 corresponding to each of the various media shown in FIG. 30. Drive change switch program 218 selects one file handle 212 selectively, whereby the initialization routine and media check routine regarding the media corresponding to the selected file handle 212 are activated.

FIG. 28 shows a system structure where drive change is carried out between HDD program C and RAM disk driver program E as file relating BIOS 186 of FIG. 30.

Referring to FIG. 28, the system software includes a file management program 182, the MS-DOS 184, and a file relating BIOS 186. Based on this system software, application software 180 and printing software 188 are mounted. Application software 180 provides a system call SC or a file access request SCT when required during execution. System call SC is supplied MS-DOS 184 to be processed. File access request SCT is supplied to file management program 182. Prior to the start of a printing operation, printing software 188 supplies a printing start request Ps to file management program 182. Upon finish of a printing operation, printing software 188 supplies a printing end request Pe to file management program 182.

File management program 182 includes a file management table 190 and drive name modifying procedures 192 and 194. Drive name modifying procedures 192 and 194 are equivalent to drive change switch program 218 shown in FIG. 31. MS-DOS 184 includes internal management information 216 having a plurality of file handles 212 shown in FIG. 31. File relating BIOS includes RAM disk drive program E and HDD program C.

File management table 190 includes a copied file handle 196, a file name table 198 and an active flag table 200. A file handle 212 in internal management information 216 selected by drive change switch program 218 of FIG. 31 is copied (loaded) into file management table 190 to be stored as copied file handle 196. File name table 198 stores all the names of the files in RAM disk 220. Active flag table 200 stores a flag for each file indicating whether or not the file corresponding to the file name registered in file name table 198 is present in the currently selected medium.

Drive name modifying procedure 192 responds to an input of a printing end request Pe to modify the drive name, i.e., the driver program from HDD program C to RAM disk driver program E. Drive name modifying procedure 194 responds to an input of a printing start request Ps to modify the driver name, i.e. the driver program from RAM disk driver program E to HDD program C. Modification of a driver program by drive name modifying procedures 192 and 194 is supplied to internal management information 216 of MS-DOS 184. Internal management information 216 selectively changes the file handle 212 shown in FIG. 31 according to the provided drive name modifying information.

In file relating BIOS 186, the actuated driver program is switched from HDD program C to RAM disk driver program E, or from RAM disk driver program E to HDD program C according to the modification of file handle 212 in internal management information 216.

When a printing end request Pe is provided, RAM disk driver program E attains an actuated status, whereby information relating to the file stored in RAM disk 220 is stored in file management table 190. Conversely, when HDD program C attains an actuated state, information relating to the file stored in HD 164 is stored in file management table 190. Therefore, when printing software 188 provides a printing start request Ps, RAM disk 220 is set to be usable as the original printer buffer. Conversely, when printing software 188 provides a printing end request Pe upon finish of a printing operation, the used printer buffer is set to be usable as a high speed accessible RAM disk 220.

The operation of a disk cache according to the present embodiment will be described with reference to FIGS. 20, and FIGS. 28–30.

(1) At the time of system turn on, the printer buffer is an unused memory. This memory is set to RAM disk 220. A file that is frequently accessed of the files stored in HD 164 is loaded (copied) from HD 164 to RAM disk 220. Here, the names of the copied files are respectively registered into file name table 198. Each of the files registered in file name table 198 has the active flag turned ON in active flag table 200. Also, a file handle 212 corresponding to RAM disk 220 in internal management information 216 is copied into file management table 190 to be registered as the copied file handle 196.

(2) When application software 280 is executed and a file access request SCT is issued to file management program 182, file management program 182 checks whether the flag regarding the relevant file is ON or not in active flag table 200.

(3) If the relevant flag is ON, the relevant file exists in RAM disk 220. File management program 182 modifies the driver number to RAM disk 220 for MS-DOS 184 to process the access request. More specifically, drive name modifying procedure 192 is executed, and RAM disk driver program E is set to an actuation allowable state. Here, RAM disk 220 is set to a read-only state for simplifying the process.

(4) When a system call SC is provided to MS-DOS 184 during the execution of application software 180, MS-DOS 184 refers to a standard buffer (1) shown in FIG. 29. When standard buffer (1) does not exist or if the size of the area to be referred to is greater than the area of standard buffer (1), MS-DOS 184 requests access in the unit of tracks/sectors to BIOS 186. Up to this time, file management program 182 controls the driver number according to a printing end request Pe or a printing start request Ps, so that the determination of whether to access a secondary storage medium (HD) or a RAM disk 220 is already made.

(5) When printing software 180 is actuated during execution of application software 180 and a release is requested to the area of RAM disk 220 for usage as a printer buffer (when a printing start request Ps is provided), file management program 182 defines the file in file name table 198 to be removed from RAM disk 220 according to the capacity of the requested release (the amount of printing data) by an algorithm of the LRU method and predetermined priorities. This file deleting process includes the process of deleting the relevant file name from file name table 198 and turning OFF the flag of the relevant file in active flag table 200. Also, the entity file of the relevant file name stored in RAM disk 220 is deleted. Thus, the capacity of RAM disk 220 occupying common memory 24 of FIG. 20 is reduced according to the capacity requested for release. The area in common memory 24 corresponding to the decreased capacity can be used for the printer buffer.

Conversely, in the case of increasing the area of the unused memory in common memory 24 of FIG. 20 (when printing software 188 provides a printing end request Pe), the capacity of RAM disk 220 increases. More specifically, the printer buffer of common memory 24 that was used for printing becomes an unused memory. This printer buffer can be used for RAM disk 220 to increase the capacity thereof. A file of high priority (of high access frequency) is further loaded (copied) from a secondary storage device (HD 164) into the increased area.

In the above described operation (3), the printer buffer in common memory 24 shown in FIG. 20 is changed to RAM disk 220 if necessary during execution of application software 180 and printing software 188. This is called a dynamic specification. Because the capacity of the specified RAM disk 220 can be set arbitrarily by the above described operation of (5), a dynamic RAM disk cache memory of variable capacity can be obtained.

The operation of using the printer buffer as the disk cache memory of a secondary storage device at the time other than printing will be described with reference to FIG. 20 and FIGS. 28–31 according to the flow charts of FIGS. 32 and 33.

The operation will be described in the order of initialization by turning on the system, a file access request from the application software, a printing start request from the printing software, and a printing end request.

Figure 33:
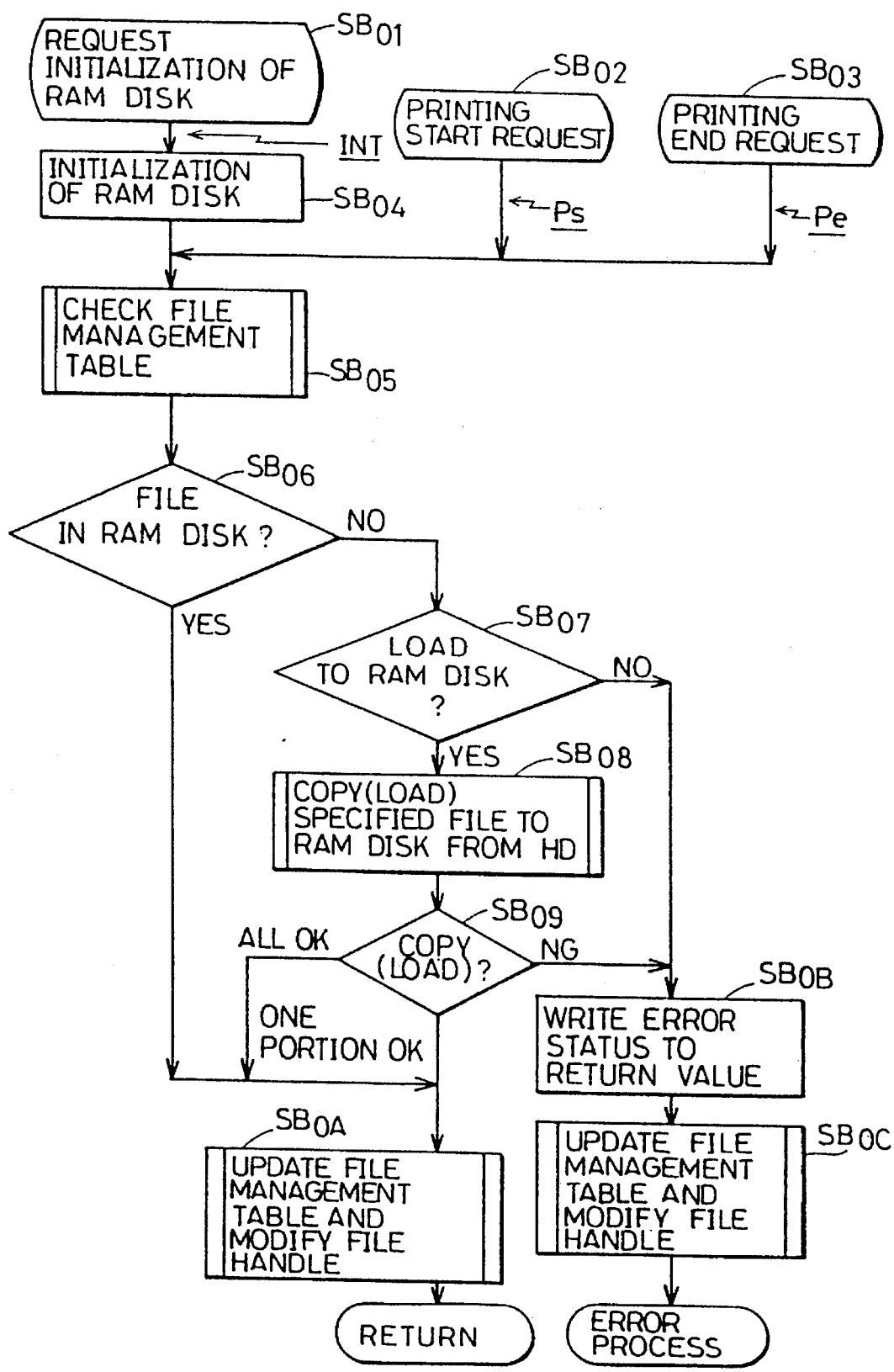
FIG. 33 is a procedure flow chart in response to a file access request from an application program in using a printer buffer as a disk cache memory in the work station shown in FIG. 20.

When the work station of FIG. 20 is turned on, initialization of the printer buffer of common memory 24 is requested in SP01 of FIG. 33. More specifically, an initialization request of RAM disk 220 is carried out via drive change switch program 218 in response to an input of an initialization request INT of FIG. 31.

At SB04, program 218 changes file handle 212 of internal management information 216 to file handle 212 of RAM disk 220 by drive name modifying procedure 192 of FIG. 28. An initialization routine is activated for file handle 212 of the changed disk 220, whereby RAM disk 220 is initialized.

At SB05, file management program 182 checks file management table 190. The result of this check is determined in the next SB06.

The process of SB05 makes determination whether there is a file in RAM disk 220. More specifically, file name table 198 of file management table 190 or active flag table 200 is referred to. If a file name is registered in file name table 198, or if a flag in active flag table 200 is set, the process proceeds to SB0A since there is a file in RAM disk 220.

Conversely, if a file name is not registered in file name table 198 and a flag in active flag table 200 is reset, the process proceeds to SB07 since a file is not loaded in RAM disk 220.

At the process of SB07, determination is made whether to load a file from HD 164 into RAM disk 220. If there is some problem such as the capacity of disk 220 is too small for the file to be loaded, the process proceeds to SB0B.

At the process of SB0B, file management program 182 writes an error status in the return value RETURN which is passed to application software 180. At SB0C, file management table 190 is updated and file handle 212 is changed to file handle 212 of HD 164 from that of RAM disk 220. At SB0C, file management table 190 is updated to set file handle 212 of HD 164 to the copied file handle 196, and file name table 198 and active flag table 200 have data set to a state that no file is registered in RAM disk 220. Then, an error process is carried out since the printer buffer could not be set to RAM disk 220 at the time of turning on the system.

Returning to the process of SB07, if file load is possible for RAM disk 220, the file specified in advance (having high frequency of access) is copied (loaded) from HD 164 to RAM disk 220 in the process of SB08.

Then, determination is made of the current copy (load) operation in SB09. For example, if copy operation is completed for all the specified files, or for a portion of the specified files, the process proceeds to SB0A.

At SB0A, update of file management table 190 and a change of the file handle are carried out by file management program 182. More specifically, driver change switch program 218 changes the file handle to file handle 212 of RAM disk 220 by drive name modifying procedure 192. File handle 212 of the selected RAM disk 220 is copied into file handle 196 in file management table 190. The name of the file copied (loaded) into RAM disk 220 is registered in file name table 198. In active flag table 200, an active flag is set for the registered file name.

Then, the control returns again to application software 180.

Returning to SB09, when copy (loading) of the specified file from HD 164 to RAM disk 220 fails, an error process including the above-described SB0B and SB0C are carried out similarly.

Thus, because the printer buffer is supposed to be unused at the time of system turn on, initialization is carried out so that the printer buffer of common memory 24 available as disk cache memory 220 of HD 164.

When the system is turned on and application software 180 is executed, application software 180 provides a file access request SCT if necessary during execution.

Figure 32:
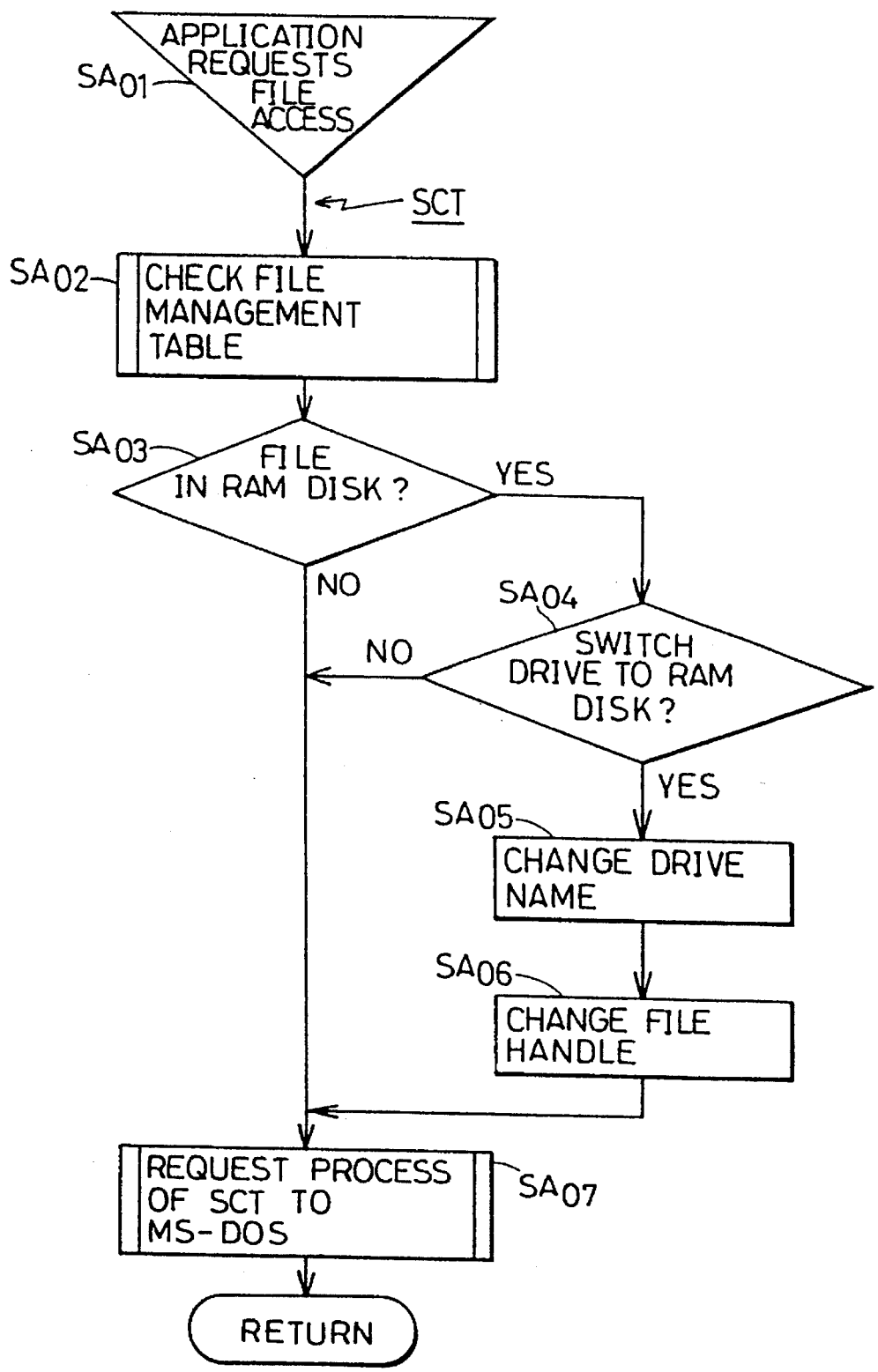
FIG. 32 is a procedure flow chart of the initialization of a disk cache memory and loading a file to a disk cache memory when a printer buffer is used as a disk cache memory in the work station shown in FIG. 20.

Referring to SA01 of FIG. 32, when application software 180 provides a file access request SCT, file management program 182 checks file management table 190 at the next process of SA02. According to this check result, determination is made in the next SA03.

At SA03, determination is made whether the flag of the file requested for access is set or not in active flag table 200 in file management table 190. If a flag is not set, the control proceeds to SA07 where a file access request SCT is provided for MS-DOS 184. MS-DOS 184 sets the desired file accessible in HD 164 via file relating BIOS 186. Then, the control returns to application software 180.

Returning to the process of SA03, if the file requested for access is registered in RAM disk 220, the control proceeds to SA04.

At SA04, file management program 182 determines whether to switch the drive to RAM disk 220. If the drive cannot be switched to RAM disk 220 owing to a request of another application software 180, the above-described SA07 is carried out. When the drive is to be switched to RAM disk 220 in SA04, the processes of SA05 and SA06 are carried out. At SA05 and SA06, drive change switching program 218 carries out the process of drive name modifying procedure 192 to change the drive name from HDD program C to RAM disk driver program E. Also, according to modification in the drive name, file handle 212 of HD 164 is changed to that of RAM disk 220 in internal management information 216 of MS-DOS 184. Then at SA07, MS-DOS 184 actuates RAM disk driver program E via file handle 212 of the selected RAM disk 220 to set an accessible state for RAM disk 220. Then, the control returns to application software 180.

Thus, when application software 180 is executed and a file access request SCT is provided during execution thereof, determination is made whether the requested file is registered in RAM disk 220, whereby either RAM disk 220 or HD 164 is defined to be accessible according to the determination result. Thus, because either RAM disk 220 or HD 160 is selectively accessed, the overhead according to a file access request of application software 180 is reduced to improve the processing speed.

When the process proceeds and printing software 188 is activated via application software 180, printing software 188 provides a printing start request Ps prior to initiation of printing.

Printing start request Ps is carried out at SB02 of FIG. 33. A generated printing start request Ps is provided to drive change switch program 218.

At SB05, file management table 190 is checked by program 182. According to this check result, determination of SB06 is carried out.

At SB06, determination is made whether a file is registered in RAM disk 220 prior to the start of a printing operation. If a register file exists, i.e. if there is a flag set in active flag table 200, the control proceeds to SB0A. At SB0A, file management table update and file handle modification are carried out as follows.

In order to restore RAM disk 220 as the original printer buffer, the file name registered in file name table 198 is first deleted. Then, all the flags registered in active flag table 200 are reset. Next, entity files registered in RAM disk 220 are deleted. In response to an input of a request Ps, drive name modifying procedure 194 is carried out to change file handle 212 to that of HD 164. Thus, common memory 24 can be used as a printer buffer.

Upon initiation of printing according to a printing start request Ps, a printing operation is carried out. When a printing end is requested by SB03 of FIG. 33 from printing software 188, a printing end request Pe is provided to drive change switch program 218 of file management program 182.

File management program 182 checks file management table 190 in response to an input of a printing end request PE at SB05. According this checking result, determination in SB06 is carried out.

At SB06, determination is made whether there is a file in RAM disk 220. Because RAM disk 220 is used as a printer buffer in the immediate preceding printing operation, there is no file. Therefore, as the result of the determination of SB06, the process of SB07 and et seq. are executed.

At SB07, determination is made whether a file is loaded from HD 164 to RAM disk 220. If common memory 24 including RAM disk 220 is used by another application software, a file cannot be loaded to RAM disk 220, and the error process of SB0B et seq. are carried out similarly.

Returning to the process of SB07, if a file is to be loaded into RAM disk 220, the process of SB08 is carried out.

At SB08, a specified file is loaded (copied) from HD 164 to RAM disk 220. This copy result is used in the determination of SB09.

At SB09, if determination is made that all or a portion of the specified files are copied in SB08, the control proceeds to SB0A.

At SB0A, update of file management table 190 and modification of file handle 212 are carried out. More specifically, file management program 182 registers all the file names copied into RAM disk 220 into file name table 198 of file management table 190, and the flag of the file name registered in active flag table 200 is set. Drive change switch program 218 carries out drive name modifying procedure 192 to change file handle 212 to that of RAM disk 220. The changed file handle 212 is copied into file management table 190 to be stored as file handle 196. Then, the control returns to application software 180.

At SB0B and SB0C, when loading is not carried out to RAM disk 220, or when copy of a specified file from HD 164 to RAM disk 220 fails, an error status is written into return value RETURN which is passed to application software 180 or printing software 188. In this case, a file name is not registered in file name table 198 and the flag of active flag table 200 are all reset in file management table 190 in the next SB0C. Also, the file handle is switched to that of HD 164 to carry out a modification error process.

Thus, when printing software 188 provides a printing end request Pe, file management table 190 is updated and file handle 212 is modified so that the memory space in common memory 24 used as the printer buffer can be used as a RAM disk 220 which is a disk cache memory of HD 164.

In the above-described third embodiment, the file loaded from HD 164 to RAM disk 220 may be a program file or a data file.

Although all the files stored in RAM disk 220 are processed to be deleted in response to a printing start request Ps in the above third embodiment, the number of files to be deleted may be adjusted according to the capacity of the requested printing data.

Although the disk cache memory relating to HD 164 is provided only in common memory 24 in the third embodiment, all the unused memories, i.e., local memory 148 in FIG. 20 and common memories 24 and 54 may be used as the disk cache memory of HD 164.

According to the third embodiment, in a provided information processor including an actual storage, a virtual storage and a high speed access storage, predetermined data in the virtual storage is transferred to be stored in a high speed access storage in response to the determination that the high speed access storage is in an unused state at the time of operation of the information processor. Information relating to the transferred predetermined data is stored in the file management table. When there is a subsequent data access request, determination is made whether the access requested data is stored in the high speed access storage, whereby either the high speed access storage or the virtual storage is selectively accessed to read out the access requested data according to the determination result. When the high speed access storage is selected, the high speed access storage becomes the disk cache memory relating to the virtual storage to increase the access speed of the virtual storage.

Because increase in this access speed can be realized using a memory structure already provided, the cost is not raised in comparison with increasing the access speed of the entire information processor, resulting in effective reduction of cost.

Because this increase in access speed is carried out using a high speed access storage that is under an unused state, the source (memory) can be utilized efficiently according to the processing state of the information processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an information processing system comprising a first memory accessible at a predetermined first access speed, a second memory independent of said first memory and accessible at a predetermined second access speed, a third memory and accessible at a third access speed slower than both said first and second access speeds, a first processor primarily using said first memory as a storage area of information, and a second processor apart from said first processor primarily using said second as a storage area of information, a method of providing an auxiliary storage area of said first comprises the steps of:

determining whether the storage capacity of an available storage area of said first memory is insufficient to accommodate a storage request of said first processor, and reserving the requested storage first in said second memory if possible, and then in said third memory.

2. The method according to claim 1, wherein said reserving step comprises the steps of:

searching first an available storage area in said second memory and then an available storage area of said third memory until the first available storage area is found having a capacity sufficient for compensating for shortage of storage capacity of said first memory, and using the available storage area found in said searching step as an area for compensating for the shortage of the storage capacity of said first memory.

3. The method according to claim 2, wherein said determination step comprises:

a step for detecting storage capacity requested for allocation by said first processor, a step for managing the size of an available storage area in said first memory, a step for determining whether the storage capacity requested for allocation by said first processor is smaller than the available storage area of said first memory by comparing the storage capacity requested for allocation by said first processor with the size of an available storage area of said first memory, a step responsive to the determination that the storage capacity requested for allocation by said first processor is smaller than the total of the available storage area of said first memory for allocating a predetermined area of said first memory into said first processor, and a step responsive to the storage capacity requested for allocation by said first processor being greater than the total of the available storage area of said first memory for requesting allocation of a storage area that is the difference between the storage capacity requested for allocation by said first processor and the total of the available storage area of said first memory.

4. The method according to claim 1, wherein said searching step comprises:

a first calculating step to search in a predetermined sequence for an available storage area in said second memory and sequentially calculating a first total, a second calculating step in response to an available storage area not found sufficient for compensating for shortage of the storage capacity of said first memory for searching in a predetermined sequence for an available storage area of said third memory for sequentially calculating a second total until the available storage area region of the first total combined with a calculated result of said second calculating step is sufficient for compensating for the shortage of the storage capacity of said first memory, allocating the available storage area in said second and third memories for use as an auxiliary storage of said first memory.

5. The method according to claim 1, wherein said second memory comprises common storage means accessible from both said first and second processors for storing data from said first processor to be printed.

6. The method according to claim 5, wherein said second processor comprises a print processor for printing out data provided to said second memory by said first processor using a printer.

7. The method according to claim 1, wherein said first memory comprises a first semiconductor memory device.

8. The method according to claim 7, wherein said second memory comprises a second semiconductor memory device.

9. The method according to claim 8, wherein said third memory comprises an external storage device including a magnetic disk drive.

10. The method according to claim 1, wherein said usage step comprises:

a step for managing said third memory as a virtual storage area for said first memory, a step for making a determination whether said second memory is currently being used, a step responsive to the determination that said second memory is not currently being used for transferring and storing in said second memory at least a portion of the virtual storage for said first memory of said third memory, a step for managing predetermined information regarding virtual information transferred to said second memory, a step for making a determination whether the access request for said first memory from said first processor requests an access to said virtual storage, a step responsive to the determination that an access is requested to said virtual storage to refer to the predetermined information regarding the virtual storage transferred to said second memory for making a determination in which of said second and third memories the relevant information is stored, and a step responsive to a determination result of said determination step for reading out and transferring to said first memory information of which access is requested of said second or third memories.

11. The method according to claim 1, wherein said usage step comprises:

step for detecting a request for allocation of said second memory by said second processor, a step responsive to detection of said allocation request for transferring and storing to one of said first and third memories said virtual storage in said second memory, and a step for releasing said second memory in which said virtual storage transferred to said first or third memories was stored for allocation to said second processor.

12. The method according to claim 1, wherein said first processor performs first adapting processing for using a first partial area of said first memory, second adapting processing for using a second partial area of said first memory, said first and second partial areas including a common area, and further comprises:

means for controlling data exchange between said first and second adapting processes via said common area, wherein said step of determining whether the storage capacity of an available storage area of said first memory is insufficient comprises:

a step of determining whether the storage area required by the data to be exchanged from the first adapting process to the second adapting process is greater than said common area, a step responsive to the determination that the storage area required by said exchange data is smaller than said common area for permitting the stored data to be read out by said second adapting process, and a step responsive to the determination that the storage area required by said exchange data is greater than said common area to request reservation of an auxiliary storage area required by said exchange data to said usage step to temporarily store said exchange data into said auxiliary storage area reserved by said usage step and said common area for permitting the stored data to be read out by said second adapting process.

13. The method according to claim 1, wherein said usage step comprises:

a step for determining whether the storage capacity of an available storage area of said first memory is insufficient in comparison to a request of said first processor, a step, responsive to the determination that the storage capacity of the available storage area of said first memory is insufficient, for selecting according to a predetermined standard the information occupying an area of a size greater than said insufficient storage area out of the information stored in said first memory, a step for searching first an available storage area of said second memory and then an available storage area of said third memory until the first available storage area having a capacity sufficient for storing said selected information is found, a step for transferring and storing into said available storage area found by said searching step said selected information stored in said first memory, a step for releasing the area of said first memory in which said transferred information was stored for usage by said first processor, and a step for transferring into said first memory the information transferred and stored in the available storage area found by said searching step in response to a request from said first processor.

14. An information processing system comprising:

a first memory accessible at a first access speed;

a second memory independent of said first memory and accessible at a second access speed;

a third memory independent of said second memory and accessible at a third access speed that is slower than both of the first and second access speeds;

a first processor primarily using said first memory;

a second processor separate from said first processor primarily using said second memory, and wherein said first processor first uses said second memory as auxiliary storage when there is insufficient storage capacity available in the first memory, and if the second memory currently lacks sufficient auxiliary storage, said first processor then uses the third memory as auxiliary storage.

15. The information processing system according to claim 14, wherein said first processor determines whether auxiliary storage is required to accommodate a current storage need of said first processor due to insufficient storage capacity in said first memory, and if the available storage area of the first memory is insufficient to meet the current storage need, first searching in said second memory for an auxiliary storage area having sufficient capacity to accommodate the current storage need.

16. The information processing system according to claim 15, wherein said first processor searches in a predetermined sequence for an available storage area in said second memory and calculates a first total amount of available storage area, and when the first total amount is insufficient to compensate for a shortage in storage capacity of said first memory, said first processor searches in a predetermined sequence for available storage in the third memory and calculates a second total amount of available storage area in the third memory, wherein the first processor allocates the available storage regions found in one or both of the second and third memories having a total to accommodate the current storage need.

17. The information processing system according to claim 16, wherein said first processor comprises:

means for detecting the amount of storage capacity requested by said first processor to store data;

means for managing a size of an available storage area in the first memory;

means for determining whether the storage capacity requested by said first processor is smaller than a total available area of said first memory by comparing the requested storage capacity amount with the size of the available area in said first memory;

means for allocating a predetermined area of said first memory to said first processor in response to the determination that the requested storage capacity amount is smaller than the total available storage area; and means for requesting allocation of a storage area having a size that is the difference between the storage capacity requested for allocation by the first processor and the total available storage area when the requested storage capacity amount is greater than the total available area.

18. The information processing system according to claim 14, wherein said second memory comprises a common storage memory accessible by both said first and second processors for storing data to be printed which has been generated by said first processor.

19. The information processing system according to claim 18, further comprising a printer, and wherein said second processor is a printing processor for printing data using said printer stored in said second memory by said first processor.

20. The information processing system according to claim 14, wherein said first memory comprises a first semiconductor memory device.

21. The information processing system according to claim 20, wherein said second memory comprises a second semiconductor memory device.

22. The information processing system according to claim 21, wherein the third memory is an external magnetic storage device.

23. The information processing system according to claim 14, further comprising:

means for managing said third memory as a virtual storage area for said first memory;

means for determining whether said second memory is currently being used;

means, responsive to the determination that said second memory is currently not being used, for transferring at least a portion of the virtual storage area to said second memory;

means for managing predetermined information regarding the virtual storage area transferred to said second memory;

means for determining whether an access request to said first memory from said first processor requests access to said virtual storage area;

means, responsive to a determination that an access to said virtual storage area is requested, for determining which of said second memory and said third memory store the relevant information; and means for reading out information from said second memory or said third memory of which access is requested for transferring the read out information to said first memory.

24. The information processing system according to claim 23, further comprising:

means for detecting a request for allocation of said second memory by said second processor;

means, responsive to detection of said allocation request, for transferring and storing said virtual storage area stored in said second memory into one of said first and third memories.

25. The information processing system according to claim 14, wherein said first processor selectively stores information in a first partial area of said first memory and a second partial area of said first memory, said first and second partial areas including a common area, means for controlling data exchange between said first and second partial areas using said common area, said means for controlling includes:
means for determining whether the storage area required by the data for the exchange is larger in capacity than said common area,
means, responsive to a determination that said storage area for the exchange is smaller than said common area, for temporarily storing said exchange data in said common area,
means, responsive to the determination that said storage area required by the exchange is larger than said common area, for reserving an auxiliary storage area for said exchange data and for temporarily storing said exchange data in said auxiliary storage area.

26. The information processing system according to claim 14, further comprising:

means for determining whether the storage capacity of an available storage area of said first memory is sufficient for a storage request from said first processor;

means, responsive to the determination of said determination means that the storage capacity of the available storage area of said first memory is insufficient, for selecting according to a predetermined standard the information occupying an area greater than said insufficient storage area out of the information stored in said first memory;

means for searching first an available storage area in said second memory and then an available storage area in said third memory until the first available storage area having a capacity sufficient for storing said selected information is found;

means for transferring and storing into the available storage area found by said searching means said selected information;

means for releasing said area of said first memory in which said transferred information was stored to be used by said first processor; and means for transferring into said first memory said information transferred and stored in the available storage area formed by said searching means in response to a request from said first processor.

* * * * *